(12) United States Patent
Konishi

(10) Patent No.: US 8,634,650 B2
(45) Date of Patent: Jan. 21, 2014

(54) IMAGE PROCESSING APPARATUS, IMAGE FORMING APPARATUS, IMAGE READING APPARATUS, AND IMAGE PROCESSING METHOD

(75) Inventor: Yohsuke Konishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 13/292,673

(22) Filed: Nov. 9, 2011

(65) Prior Publication Data

US 2012/0057795 A1  Mar. 8, 2012

(30) Foreign Application Priority Data

Nov. 11, 2010 (JP) ................................. 2010-252753

(51) Int. Cl.
*G06K 9/46* (2006.01)

(52) U.S. Cl.
USPC .......................................................... 382/195

(58) Field of Classification Search
None
See application file for complete search history.

(56) References Cited

U.S. PATENT DOCUMENTS

| 5,282,026 A | 1/1994 | Nagata |
| 2007/0146814 A1 | 6/2007 | Asada |
| 2009/0284801 A1* | 11/2009 | Sakaue et al. ................ 358/3.27 |

FOREIGN PATENT DOCUMENTS

| JP | 4-282968 A | 10/1992 |
| JP | 7-336503 | 12/1995 |
| JP | 11-331547 A | 11/1999 |
| JP | 2002-218232 A | 8/2002 |
| JP | 2002-232708 A | 8/2002 |
| JP | 2007-174479 A | 7/2007 |
| JP | 2009-278363 A | 11/2009 |

* cited by examiner

*Primary Examiner* — Stephen R Koziol
*Assistant Examiner* — Amandeep Saini
(74) *Attorney, Agent, or Firm* — Birch, Stewart, Kolasch & Birch, LLP

(57) ABSTRACT

An image processing apparatus includes an image area extracting section for identifying and extracting, on the basis of inputted image data, an image area within the document where an image is present. The image area extracting section includes an image area detecting section for comparing a pixel value of each part of an image of the inputted image data with a threshold value so as to detect, as the image area, an area where a pixel value is larger than the threshold value. The image area extracting section further includes a judging section for judging a type of the inputted image data, and a threshold value changing section for changing the threshold value used in the image area detecting section to one suitable for the type of the inputted image data in accordance with the type judged by the judging section.

7 Claims, 14 Drawing Sheets

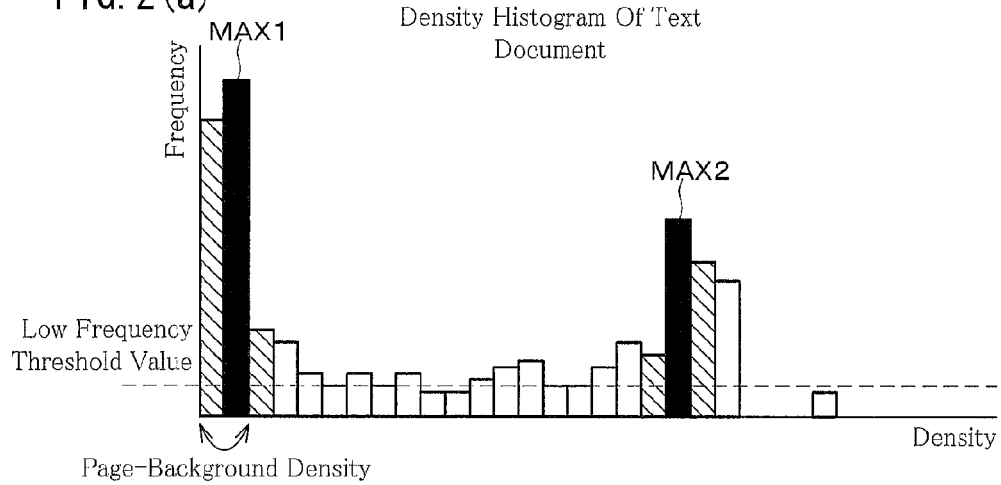
FIG. 2(a) Density Histogram Of Text Document
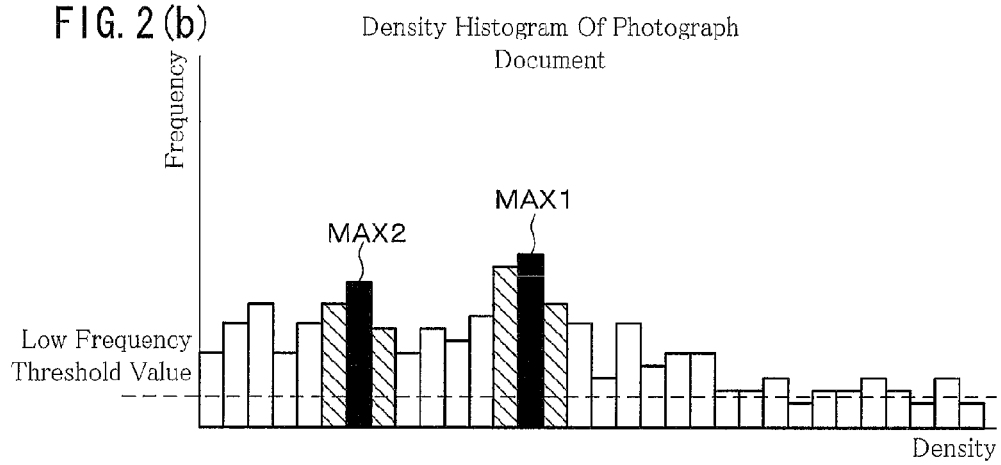
FIG. 2(b) Density Histogram Of Photograph Document
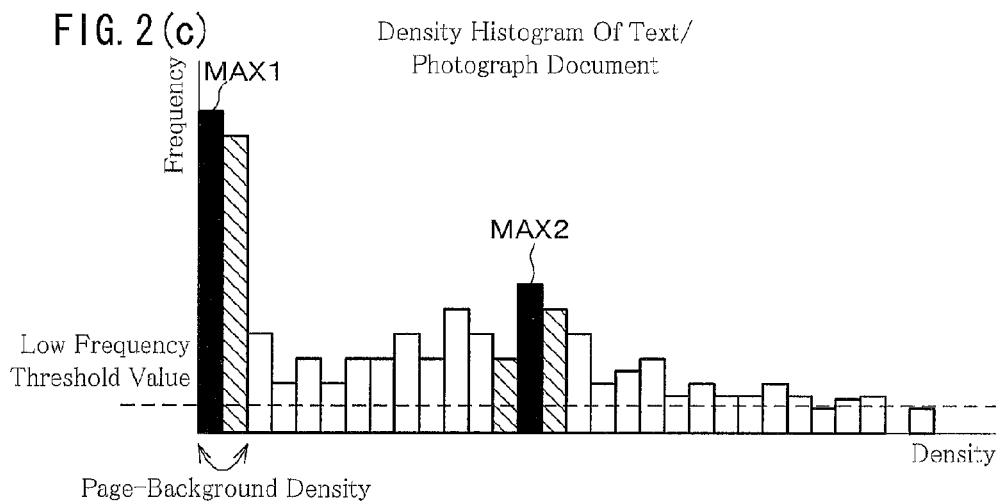
FIG. 2(c) Density Histogram Of Text/Photograph Document

FIG. 11(a)

| Index | Left Edge Coordinate | Right Edge Coordinate |
|---|---|---|
| 1 | $L''_{1x}, L''_{1y}$ | $R''_{1x}, R''_{1y}$ |
| 2 | $L''_{2x}, L''_{2y}$ | $R''_{2x}, R''_{2y}$ |
| 3 | $L''_{3x}, L''_{3y}$ | $R''_{3x}, R''_{3y}$ |
| ⋮ | ⋮ | ⋮ |
| M-1 | $L''_{M-1x}, L''_{M-1y}$ | $R''_{M-1x}, R''_{M-1y}$ |
| M | $L''_{Mx}, L''_{My}$ | $R''_{Mx}, R''_{My}$ |

FIG. 11(b)

| Index | Top Edge Coordinate | Bottom Edge Coordinate |
|---|---|---|
| 1 | $T''_{1x}, T''_{1y}$ | $B''_{1x}, B''_{1y}$ |
| 2 | $T''_{2x}, T''_{2y}$ | $B''_{2x}, B''_{2y}$ |
| 3 | $T''_{3x}, T''_{3y}$ | $B''_{3x}, B''_{3y}$ |
| ⋮ | ⋮ | ⋮ |
| N-1 | $T''_{N-1x}, T''_{N-1y}$ | $B''_{N-1x}, B''_{N-1y}$ |
| N | $T''_{Nx}, T''_{Ny}$ | $B''_{Nx}, B''_{Ny}$ |

FIG. 12

| $\tan\theta, \tan\alpha$ | $\theta, \alpha$ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| ⋮ | |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

FIG. 13 (a)

| Index | Left Edge Coordinate | Right Edge Coordinate | Left Edge Corrected Coordinate | Right Edge Corrected Coordinate |
|---|---|---|---|---|
| 1 | $L_{1x}, L_{1y}$ | $R_{1x}, R_{1y}$ | $L'_{1x}, L'_{1y}$ | $R'_{1x}, R'_{1y}$ |
| 2 | $L_{2x}, L_{2y}$ | $R_{2x}, R_{2y}$ | $L'_{2x}, L'_{2y}$ | $R'_{2x}, R'_{2y}$ |
| 3 | $L_{3x}, L_{3y}$ | $R_{3x}, R_{3y}$ | $L'_{3x}, L'_{3y}$ | $R'_{3x}, R'_{3y}$ |
| ... | ... | ... | ... | ... |
| M-1 | $L_{M-1x}, L_{M-1y}$ | $R_{M-1x}, R_{M-1y}$ | $L'_{M-1x}, L'_{M-1y}$ | $R'_{M-1x}, R'_{M-1y}$ |
| M | $L_{Mx}, L_{My}$ | $R_{Mx}, R_{My}$ | $L'_{Mx}, L'_{My}$ | $R'_{Mx}, R'_{My}$ |

FIG. 13 (b)

| Index | Top Edge Coordinate | Bottom Edge Coordinate | Top Edge Corrected Coordinate | Bottom Edge Corrected Coordinate |
|---|---|---|---|---|
| 1 | $T_{1x}, T_{1y}$ | $B_{1x}, B_{1y}$ | $T'_{1x}, T'_{1y}$ | $B'_{1x}, B'_{1y}$ |
| 2 | $T_{2x}, T_{2y}$ | $B_{2x}, B_{2y}$ | $T'_{2x}, T'_{2y}$ | $B'_{2x}, B'_{2y}$ |
| 3 | $T_{3x}, T_{3y}$ | $B_{3x}, B_{3y}$ | $T'_{3x}, T'_{3y}$ | $B'_{3x}, B'_{3y}$ |
| ... | ... | ... | ... | ... |
| N-1 | $T_{N-1x}, T_{N-1y}$ | $B_{N-1x}, B_{N-1y}$ | $T'_{N-1x}, T'_{N-1y}$ | $B'_{N-1x}, B'_{N-1y}$ |
| N | $T_{Nx}, T_{Ny}$ | $B_{Nx}, B_{Ny}$ | $T'_{Nx}, T'_{Ny}$ | $B'_{Nx}, B'_{Ny}$ |

FIG. 15

Output Sheet Size Table Prepared When Resolution Is 300 dpi

| Sheet Size | Width | Height |
|---|---|---|
| A3 | 3519 | 4972 |
| A4R | 3519 | 2492 |
| B4 | 3047 | 4311 |
| B5R | 3047 | 2161 |
| A4 | 2492 | 3519 |
| A5R | 2492 | 1760 |
| B5 | 2161 | 3047 |
| A5 | 1760 | 2492 |
| B6 | 1523 | 2161 |
| A6 | 1252 | 1760 |

IMAGE PROCESSING APPARATUS, IMAGE FORMING APPARATUS, IMAGE READING APPARATUS, AND IMAGE PROCESSING METHOD

This Nonprovisional application claims priority under 35 U.S.C. §119(a) on Patent Application No. 2010-252753 filed in Japan on Nov. 11, 2010, the entire contents of which are hereby incorporated by reference.

TECHNICAL FIELD

The present invention relates to an image processing apparatus, an image forming apparatus, an image reading apparatus, and an image processing method, each of which is for carrying out processing of detecting and extracting an area within a document where an image is present, with respect to image data obtained by reading the document with the use of an image input apparatus such as a scanner.

BACKGROUND ART

There is a technique for (i) detecting skew of a document image on the basis of image data obtained by reading a document with the use of an image input apparatus such as a scanner and (ii) correcting the skew of the document image so as to display or print the document image which is not skewed. The term "document image" used herein refers to an image obtained by reading a document, and the term "image area" refers to an area within a document where an image (content) is present.

For example, Patent Literature 1 discloses that a document is read by reading a maximum readable area regardless of a document size so that image data of a maximum size is obtained, and an area of a sheet size of the document (same as the document size) inputted by a user is found as a crop box. The crop box is a rectangular area, and is, for example, expressed by a combination of y-coordinates of an upper end and a lower end and x-coordinates of an right end and a left end (the coordinates are determined on the basis of an origin of the image of the maximum size).

Specifically, an area where an image density is equal to or larger than a predetermined threshold value in the image data of the maximum size is detected as an area where an image is present, and an area which encompasses the area where the image is present and which has a shape and a size corresponding to the sheet size of the document is found as a crop box. The area where the image is present is generally smaller than the sheet size. Accordingly, a position of the crop box is, for example, determined so that the area where the image is present is located at a center of the area of the crop box.

Information about the crop box thus found is associated with the image data as attribute information of the image data of the maximum size. When displaying or printing the document image, the crop box is cut out from the image data on the basis of the attribute information, and only the image within the crop box is displayed or printed. Accordingly, skew of the document image is corrected.

CITATION LIST

Patent Literature 1
Japanese Patent Application Publication, Tokukai, No. 2007-174479 (Publication Date: Jul. 5, 2007)
Patent Literature 2
Japanese Patent Application Publication, Tokukaihei, No. 4-282968 (Publication Date: Oct. 8, 1992)
Patent Literature 3
Japanese Patent Application Publication, Tokukai, No. 2002-218232 (Publication Date: Aug. 2, 2002)
Patent Literature 4
Japanese Patent Application Publication, Tokukai, No. 2002-232708 (Publication Date: Aug. 16, 2002)
Patent Literature 5
Japanese Patent Application Publication, Tokukaihei, No. 11-331547 (Publication Date: Nov. 30, 1999)

SUMMARY OF INVENTION

Technical Problem

However, in Patent Literature 1, there is a problem that an image area within a document where an image is present cannot be properly detected depending on type of read image data (hereinafter also referred to as "inputted image data"). This is because a single predetermined value is used as a threshold value used for detection of an image area.

For example, in a case where the inputted image data is limited to binary image data, which is obtained by reading a monochromatic document, there occurs no problem even if a single predetermined value is used as the threshold value. However, the inputted image data includes not only binary image data, which is obtained by reading a monochromatic document, but also multilevel image data, which is obtained by reading a gray scale document (document which is monochromatic but has gradation) or a color document. Since there are plural types (kinds) of inputted image data, an image area cannot be accurately detected in a case where a threshold value which is set for one type of image data is used for image data of another type.

One way to solve such a problem is to use a threshold value which is set to suit all types of inputted image data. However, this cannot improve accuracy of detection as compared with a case where threshold values which are set for respective types are used.

The present invention was attained in order to solve the above problem, and an object of the present invention is to provide an image processing apparatus, an image forming apparatus, and an image processing method, each of which is for accurately detecting an image area within a document where an image is present regardless of type of inputted image data.

Solution to Problem

In order to attain the above object, an image processing apparatus of the present invention includes an image area extracting section for identifying and extracting, on a basis of inputted image data obtained by reading a document with use of an image input apparatus, an image area within the document where an image is present, the image area extracting section including an image area detecting section for comparing a pixel value of each part of an image of the inputted image data with a threshold value so as to detect, as the image area, an area where a pixel value is larger than the threshold value, and the image area extracting section further including a discrimination section for judging a type of the inputted image data, and a threshold value changing section for changing the threshold value used in the image area detecting section to one suitable for the type of the inputted image data in accordance with the type judged by the discrimination section.

The present invention encompasses an image forming apparatus and an image reading apparatus including the image processing apparatus of the present invention.

In order to attain the above object, an image processing method of the present invention includes the step of (a) identifying and extracting, on a basis of inputted image data obtained by reading a document with use of an image input apparatus, an image area within the document where an image is present, the step (a) including (b) comparing a pixel value of each part of an image of the inputted image data with a threshold value so as to detect, as the image area, an area where a pixel value is larger than the threshold value, and the step (a) further including (c) judging a type of the inputted image data and (d) changing the threshold value used in the step (b) to one suitable for the type of the inputted image data before the step (b) in accordance with the type judged in the step (c).

Advantageous Effects of Invention

According to the image processing apparatus of the present invention, the image area detecting section of the image area extracting section compares a pixel value of each part of an image of the inputted image data with a threshold value, and detects, as an image area, an area where a pixel value is larger than the threshold value. As described above, it is preferable that the threshold value used in the image area detecting section is determined in accordance with the type of the inputted image data to be processed.

In view of this, according to the arrangement, the image area extracting section further includes a discrimination section for judging the type of the inputted image data and a threshold value changing section for changing the threshold value used in the image area detecting section to one suitable for the type of the inputted image data in accordance with the type judged by the discrimination section.

The discrimination section judges, as the type of the inputted image data, for example, whether the inputted image data is binary image data, which is image data obtained by reading a monochromatic document, or multilevel image data, which is image data obtained by reading a monochromatic grayscale document or a color document. The threshold value changing section changes the threshold value used in the image area detecting section to one suitable for the type of the inputted image data in accordance with the judged type of the inputted image data. This allows the image area detecting section to detect the image area with the use of the threshold value suitable for the type of the inputted image data.

According to the arrangement, the threshold value used in the image area detecting section is thus automatically changed in accordance with the type of the inputted image data even if a user himself does not change it. This makes it possible to accurately identify and extract an image area with the use of an appropriate threshold value without the need for the user to pay attention to the type of the inputted image data.

In the image processing method, the type of the inputted image data is judged in the step (c), and the threshold value used in the step (b) is changed to one suitable for the type of the inputted image data in the step (d) in accordance with the type of the inputted image data judged in the step (c). Accordingly, in the step (b), the image area can be detected with the use of the threshold value suitable for the type of the inputted image data.

This makes it possible to accurately identify and extract an image area with the use of an appropriate threshold value without the need for the user to pay attention to the type of the inputted image data, as in the image processing apparatus of the present invention.

According to the present invention, it is therefore possible to provide an image processing apparatus, an image forming apparatus, an image processing method, a program, and a recording medium, each of which can accurately detect an image area within a document where an image is present, regardless of type (kind) of inputted image data.

BRIEF DESCRIPTION OF DRAWINGS

FIG. 2(a) is a diagram explaining automatic document type discrimination processing for which a type discrimination section of the image processing apparatus can be used, and shows an example of a density histogram of a text document.

FIG. 2(b) is a diagram explaining automatic document type discrimination processing for which the type discrimination section of the image processing apparatus can be used, and shows an example of a density histogram of a photograph document.

FIG. 2(c) is a diagram explaining automatic document type discrimination processing for which the type discrimination section of the image processing apparatus can be used, and shows an example of a density histogram of a text/photograph document.

FIG. 11(a) is a table showing coordinate information on a first left edge coordinate ($L''_X$, $L''_Y$) and a first right edge coordinate ($R''_X$, $R''_Y$) which are extracted from an edge image detected by an edge detection for skew detection section of the document skew/size detecting section.

FIG. 11(b) is a table showing coordinate information on a first top edge coordinate ($T''_X$, $T''_Y$) and a first bottom edge coordinate ($B''_X$, $B''_Y$) which are extracted from an edge image detected by the edge detection for skew detection section of the document skew/size detecting section.

FIG. 12 is a table showing how values of tan θ and tan α and values of θ and α used in an angle calculating section of the document skew/size detecting section are related to each other.

FIG. 13(a) is a table showing (i) coordinate information on a second left edge coordinate ($L_X$, $L_Y$) and a second right edge coordinate ($R_X$, $R_Y$) which are extracted from an edge image detected by an edge detection for image area extraction section of the document skew/size detecting section and (ii) coordinate information on a second left corrected edge coordinate ($L_X$, $L_Y$) and a second right corrected edge coordinate ($R_X$, $R_Y$) which are corrected based on skew a by a coordinate information conversion section.

FIG. 13(b) is a table showing (i) coordinate information on a second top edge coordinate ($T_X$, $T_Y$) and a second bottom edge coordinate ($B_X$, $B_Y$) which are extracted from an edge image detected by the edge detection for image area extraction section of the document skew/size detecting section and (ii) coordinate information on a second top corrected edge coordinate ($T_X$, $T_Y$) and a second bottom corrected edge coordinate ($B_X$, $B_Y$) which are corrected based on skew a by the coordinate information conversion section.

FIG. 15 is a diagram showing an example of a sheet size table used by a correction parameter generation section of the document skew/size detecting section.

DESCRIPTION OF EMBODIMENTS

An embodiment of the present invention is described below in detail with reference to FIGS. 1 through 18.

Figure 1:
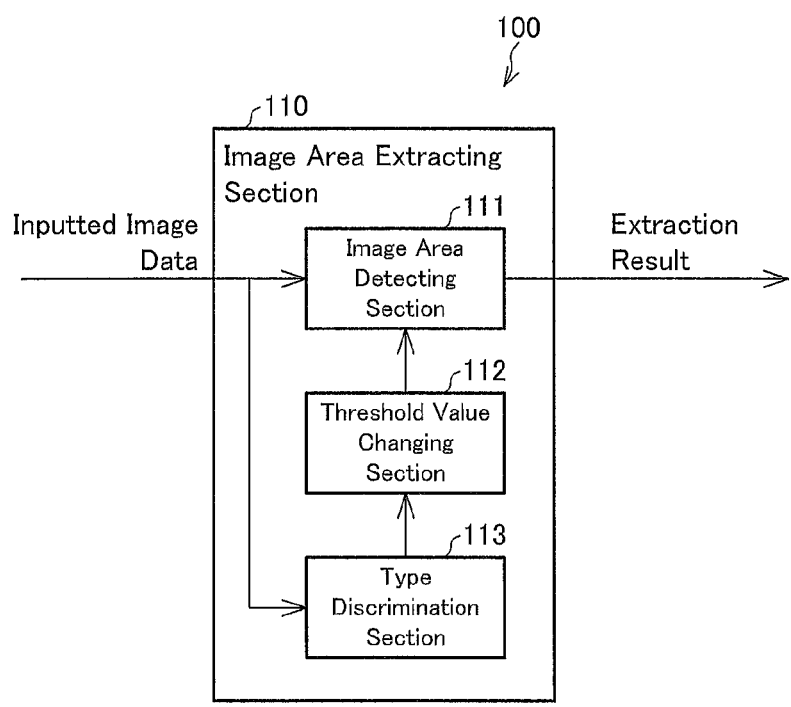
FIG. 1 is a block diagram illustrating a configuration of a substantial part of an image processing apparatus of an embodiment of the present invention.

First, a substantial part of an image processing apparatus 100 of the present embodiment is described with reference to FIG. 1. FIG. 1 is a block diagram illustrating a configuration of the substantial part of the image processing apparatus 100.

As shown in FIG. 1, the image processing apparatus 100 includes an image area extracting section 110. The image area extracting section 110 identifies and extracts an image area (content area) within a document where an image (content) is present on the basis of inputted image data obtained by reading the document with the use of an image input apparatus such as a scanner. The image area extracting section 110 constitutes an image area extracting section 152 (see FIG. 10) of a document skew/size detecting section 26 in a digital color multifunction printer 1 (later described).

As shown in FIG. 1, the image area extracting section 110 includes an image area detecting section 111, a threshold value changing section 112, and a type discrimination section 113.

The image area detecting section 111 compares a pixel value (pixel density value) of each part of an image of inputted image data with a threshold value so as to detect, as an image area, an area where a pixel value is larger than the threshold value. In the present embodiment, the image area detecting section 111 detects an edge of an image area by comparing a pixel value of an image of inputted image data with a threshold value.

A noteworthy point is that the threshold value used for detection of an image area by the image area detecting section 111 is changed depending on a type of inputted image data. This allows the image area detecting section 111 to detect an image area by using a threshold value suitable for the type of the inputted image data. Since a threshold value suitable for the type of the inputted image data can be used, it is possible to accurately detect an image area regardless of the type of the inputted image data.

The threshold value used in the image area detecting section 111 is changed by the type discrimination section 113 and the threshold value changing section 112. The type discrimination section 113 judges the type of the inputted image data, and a result of the judgment is supplied to the threshold value changing section 112. In the present embodiment, the type discrimination section 113 judges, as the type of the inputted image data, whether the inputted image data is binary image data, which is obtained by reading a monochromatic document, or multilevel image data, which is obtained by reading a monochromatic grayscale document (i.e., document which is monochromatic, but has gradation) or a color document.

The type of the inputted image data may be judged on the basis of a mode designating signal indicative of a mode designated by a user or on the basis of a result of automatic color selection (ACS) processing for automatically judging whether or not an image is a color image and a result of automatic document type discrimination processing.

First, an arrangement utilizing the mode designating signal is described. The image processing apparatus 100 is normally provided in an image forming apparatus such as a multifunction printer. In such an image forming apparatus, a color mode is designated, for example, with the use of an operation panel before a document is read. Examples of the color mode include a full color mode, an automatic mode (automatic color selection (ACS)), a grayscale (black-and-white multilevel) mode, a black-and-white binary mode, a single color mode, and a two-color mode. When a color mode is designated, a mode designating signal indicative of the mode thus designated is supplied from the operation panel to each section of the image forming apparatus.

The inputted image data is monochromatic binary image data in a case where the black-and-white binary mode is designated as the color mode. Meanwhile, in a case where a color mode other than the black-and-white binary mode is designated, the inputted image data is multilevel image data.

It is also possible that an output mode (a multilevel output mode or a binary output mode) is further designated in addition to a color mode. In this case, it is determined whether image data is binary image data or multilevel image data on the basis of a combination of the output mode and the color mode. For example, it is also possible that the single color mode and the binary output mode are selected so that an outputted color is designated and binary image data is outputted. Alternatively, it is also possible that the automatic mode and the binary output mode are selected so that binary image data is outputted in a case where it is determined, as a result of the automatic color selection, that a document is a monochromatic document. The type of the inputted image data can be easily judged by utilizing such a mode designating signal.

Next, the following describes an arrangement utilizing a result of automatic color selection (ACS) processing and a result of automatic document type discrimination processing.

First, the automatic color selection processing is described. The automatic color selection processing is a technique for automatically judging, on the basis of inputted image data, whether a document is a monochromatic image or a color image. For example, the method disclosed in Patent Literature 2 can be used.

According to this method, it is determined whether or not each pixel is a color pixel or a monochromatic pixel. In a case where presence of a predetermined number or more of successive color pixels in a given order of pixels is detected, the successive color pixels are recognized as a color block. In a case where a predetermined number or more of color blocks is present in a line, the line is counted as a color line. If a predetermined number of color lines is present in a document, the document is judged as a color image, and if not, the document is judged as a monochromatic image. A standard for judging whether or not a block is a color block and the number of color lines in a document can be appropriately set depending on how many color pixels need to be included in a document in order that the document is judged as a color document.

In the method, the judgment as to whether each pixel is a color pixel or a monochromatic pixel can be made by using a known method such as a method of comparing a difference between a maximum value and a minimum value of RGB signals with a threshold value THa (max (R, G, B)−min (R, G, B)≥THa (20, for example)) or a method of obtaining an absolute value of a difference between color components of RGB signals and comparing the absolute value with a threshold value.

Alternatively, it is determined whether or not a pixel is a chromatic pixel or an achromatic pixel, by comparing a difference between a maximum value and a minimum value of RGB signals with a threshold value THa (20, for example). The number of pixels which are judged as chromatic pixels in an entire document is counted, and in a case where the number of chromatic pixels is, for example, 7000 or more, the document is judged as a color document. Instead of percentage of chromatic pixels to the entire document, an absolute number is used as the threshold value THa so that even a large A3 document stamped with a seal or the like can be judged as a color document.

The judgment as to whether a pixel is a chromatic pixel or an achromatic pixel may be made by using a known method such as a method of obtaining an absolute value of a difference between color components of RGB signals and comparing the absolute value with a threshold value. Further, the judgment method for the ACS is not limited to the above method, and can be any method, provided that it can be accurately determined whether a document is a color document or a monochromatic document.

Next, the following describes the automatic document type discrimination processing. The automatic document type discrimination processing is a technique for automatically judging, based on inputted image data, a document type, i.e., whether a read document is a text document, a printed photograph document or a text/printed photograph document in which a text and a printed photograph are mixed. For example, the method disclosed in Patent Literature 3 can be used.

According to the method disclosed in Patent Literature 3, a density histogram of a document is created, and it is determined, based on features indicated by the density histogram, whether a read document is a text document, a printed photograph document or a text/printed photograph document. Note that the term "photograph" used herein includes a printed photograph constituted by halftone dots and a photograph constituted by a continuous tone area.

FIG. 2(a) shows an example of a density histogram of a text document, FIG. 2(b) shows an example of a density histogram of a photograph document, and FIG. 2(c) shows an example of a density histogram of a text/photograph document. The above method utilizes differences among characteristics of the density histograms of these different types of documents.

A text document is generally constituted by a text and a page-background. Accordingly, in a density histogram of a text document, an entire density tone width is small while frequencies in density sections corresponding to the text and the page-background are high, as shown in FIG. 2(a). In other words, one characteristic of a text document is that there are many low frequency density sections.

It can be determined whether an inputted document is a text document or not by utilizing this characteristic. Specifically, low frequency density sections are extracted by comparing frequency in each density section with a low frequency threshold value, and the number of low frequency density sections thus extracted is counted. Then, the number of low frequency density sections is compared with a first threshold value to check how large (or how small) the number of low frequency density sections is. The first threshold value is set in advance to determine whether or not the number of low frequency density sections is large or not.

Another characteristic of a general text document is that a percentage of a page-background to an entire document is large. That is, in a case where a maximum frequency value MAX1 extracted from the density histogram is close to a total frequency value, it can be acknowledged that a density section from which MAX1 is extracted corresponds to a page-background of a text document.

Accordingly, by comparing MAX1 with a second threshold value which is set in advance so as to determined whether or not MAX1 is close to the total frequency value, presence of a page-background can be determined by judging whether MAX1 is larger than the second threshold value or not. Thus, it can be determined whether an inputted document is a text document or not.

A photograph document generally has a wide density tone width and has a little bias in the tone width. Accordingly, one characteristic of a density histogram of a photograph document is that the density tone width is wide and that two or more peaks of nearly the same level exist, as shown in FIG. 2(b).

Accordingly, by extracting, from the density histogram, a first maximum frequency density section and a second maximum frequency density section each of which has a maximum frequency value and which are not adjacent to each other and by setting the maximum frequency values as a first maximum frequency value (MAX1) and a second maximum frequency value (MAX2), it can be determined, by checking a value (MAX1−MAX2), whether or not two peaks of nearly the same level exist in the density histogram. Thus, it can be determined whether an inputted document is a photograph document or not.

However, it is expected that the value (MAX1−MAX2) by which a document is judged as a photograph document changes depending on a document size. In order to reduce influence of a document size on judgment of a document type, it is preferable that a percentage of total frequencies (ALL) to the value (MAX1−MAX2) is compared with a third threshold value which is set in advance so as to determine whether two peaks have nearly the same level or not.

In a case where a document is a text/photograph document in which a photograph image occupies a large part and a text image exist only in a small area, there is a possibility that the value (MAX1−MAX2) is almost equal to that of a photograph document which has only a photograph image. In such a case, however, the third threshold value is determined after it is determined in advance whether an inputted document is processed as a text/photograph document or as a photograph document. It is preferable that the third threshold value is determined on the basis of relationship between the document types by measuring the value (MAX1−MAX2) for as many documents as possible.

Further, there may be a case where a text document and a photograph document exist whose differences between the first maximum frequency value (MAX1) and the second maximum frequency value (MAX2) in a density histogram are equal. In this case, the text document and the photograph document are the same in percentage of total frequencies (ALL) to the value (MAX1−MAX2), and therefore the text document and the photograph document cannot be distinguished from each other.

In view of this, it is determined in advance whether an inputted document is a text document or not, and then it is determined, only for a document which has been judged as a document which is not a text document, whether the document is a photograph document or not. Thus, it is possible to surely distinguish a text document and a photograph document, thereby surely eliminating wrong judgment.

As shown in FIG. 2(c), a density histogram of a text/photograph document has neither the characteristic of the text document nor the characteristic of the photograph document. Accordingly, an inputted document which is not judged as a text document nor a photograph document can be judged as a text/photograph document.

Image data of a document that is judged as a text document in the automatic document type discrimination processing is judged as binary image data. Image data of a document that is judged as a photograph document is judged as multilevel image data. Image data of a document that is judged as a text/photograph document, in which a text and a photograph are mixed, in the automatic document type discrimination processing is judged as image data in which binary image data and multilevel image data are mixed.

In a case where image data is judged as image data in which binary image data and multilevel image data are mixed, a user may be prompted to input an instruction as to whether the image data is processed as multilevel image data or binary image data. Alternatively, it may be determined whether the image data is processed as multilevel image data or binary image data, on the basis of a ratio between the number of pixels in an area judged as a photograph (halftone dots and a continuous tone area) and the number of pixels in an area judged as a text with reference to a result of a segmentation process (segmentation into text, halftone dot, continuous tone, and page-background). For example, in a case where the number of pixels in the area judged as a text is larger than the number of pixels in the area judged as a photograph, the image data is processed as binary image data. In a case where the number of pixels in the area judged as a photograph is larger than the number of pixels in the area judged as a text, the image data is processed as multilevel image data. In a case where the number of pixels in the area judged as a text is almost the same as the number of pixels in the area judged as a photograph, the image data is processed as multilevel image data. Alternatively, a user may be prompted to determine whether the image data is processed as binary image data or multilevel image data.

The segmentation process is a process for judging what kind of area each pixel of inputted image data belongs to. For example, it is determined which of the areas such as text, halftone, continuous tone, and page-background a pixel belongs. The image area judgment of the segmentation process may be performed for each group of pixels, not for each pixel. The method disclosed in Patent Literature 4 for example can be used as the segmentation process.

According to the method disclosed in Patent Literature 4, a maximum density difference which is a difference between a minimum density value and a maximum density value in n×m (e.g., 15×15) blocks including a target pixel and a total density busyness which is the sum of absolute values of density differences between adjacent pixels are calculated, and are compared with a plurality of predetermined threshold values, so as to determine which of the page-background area/continuous tone area and text edge area/halftone area the target pixel belongs to.

First, the maximum density difference and the total density busyness are calculated, and the maximum density difference is compared with a maximum density difference threshold value, and the total density busyness is compared with a total density busyness threshold value. If it is determined that the maximum density difference is smaller than the maximum density difference threshold value and that the total density busyness is smaller than the total density busyness threshold value, it is determined that the target pixel belongs to the page-background area/continuous tone area, and if not, it is determined that the target pixel belongs to the text edge area/halftone area.

Next, in a case where it is determined that the target pixel belongs to the page-background area/continuous tone area, the calculated maximum density difference is compared with a page-background/continuous tone area judging threshold value. In a case where the maximum density difference is smaller than the page-background/continuous tone area judging threshold value, it is determined that the target pixel belongs to the page-background area, whereas in a case where the maximum density difference is larger than the page-background/continuous tone area judging threshold value, it is determined that the target pixel belongs to the continuous tone area.

In a case where it is determined that the target pixel belongs to the text edge area/halftone area, the calculated total density busyness is compared with a value obtained by multiplying the maximum density difference by a text/halftone judging threshold value. In a case where the total density busyness is smaller than the value, it is determined that the target pixel belongs to the text edge area, whereas in a case where the total density busyness is larger than the value, it is determined that the target pixel belongs to the halftone area.

According to the arrangement in which a judgment result of the automatic color selection processing and a judgment result of the automatic document type discrimination processing are used for judgment of a type of inputted image data, even if an inputted document is a document constituted by plural pages including color pages and black-and-white pages, a type of inputted image data can be judged for each page, and therefore a threshold value used in the image area detecting section 111 can be switched for each page, thereby further improving convenience.

Further, in a case where the image processing apparatus 100 is mounted in a computer to which inputted image data read by an image forming apparatus or an image reading apparatus is sent and where identification and extraction of an image area is carried out in the computer with respect to the inputted image data sent to the computer, it can be determined, on the basis of a header of the inputted image data, whether the inputted image data is multilevel image data or binary image data.

The threshold value changing section 112 changes, based on a result of judgment of the type of the inputted image data supplied from the type discrimination section 113a, the threshold value used for image area detection of the image area detecting section 111 into one suitable for the type of the image data.

In the present embodiment, the threshold value changing section 112 changes the threshold value into one suitable for binary image data in a case where the inputted image data is binary image data, and changes the threshold value into one suitable for multilevel image data in a case where the inputted image data is multilevel image data.

Specifically, the threshold value changing section 112 has three parameters, i.e., an image area detection parameter, a conversion parameter for binary image data, and a conversion parameter for multilevel image data, and switches a conversion parameter to be combined with the image area detection parameter, in accordance with the result of the judgment of the type discrimination section 113.

In a case where the inputted image data is multilevel image data such as color image data or grayscale image data, the threshold value is calculated by adding the conversion parameter for multilevel image data to the image area detection parameter. Meanwhile, in a case where the inputted image data is monochromatic binary image data, the threshold value is calculated by adding the conversion parameter for binary image data to the image area detection parameter.

In a case where the color image data is, for example, 8-bit data, the binary image data is handled as 0 and 255 of 8-bit data, and therefore noise is more likely to be detected as an image area, as compared with color or grayscale images.

In view of this, in the present embodiment, the conversion parameter for binary image data is made larger than the conversion parameter for multilevel image data in the threshold value changing section 112 so that the threshold value used for image area detection for a binary image becomes larger than that for a multilevel image. For example, the image area detection parameter is set to 20, the conversion parameter for multilevel image data is set to −8, and the conversion parameter for binary image data is set to 0.

In a case where the threshold values used for image area detection are set so that the threshold value for a binary image is larger than that for a multilevel image, it is possible to prevent noise from being detected as an image area (edge) in image area extracting processing for a binary image.

Figure 3:
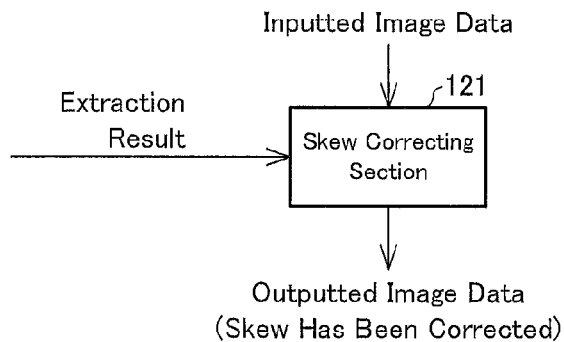
FIG. 3 is an explanatory view showing exemplary processing carried out with the use of an extraction result obtained in the image processing apparatus.
Figure 4:
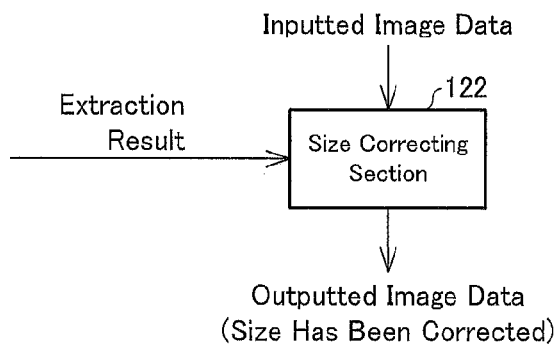
FIG. 4 is an explanatory view showing exemplary processing carried out with the use of an extraction result obtained in the image processing apparatus.
Figure 5:
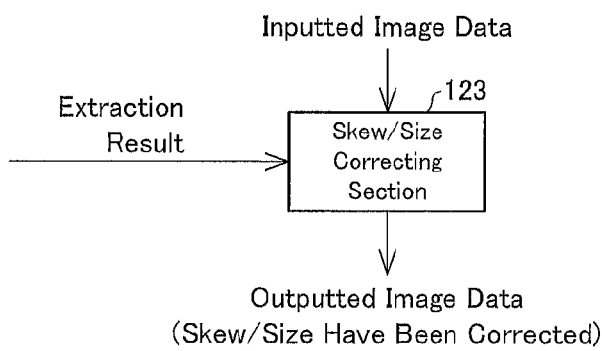
FIG. 5 is an explanatory view showing exemplary processing carried out with the use of an extraction result obtained in the image processing apparatus.

Such information (extraction result) on the image area extracted by the image area extracting section 110 is, for example, supplied to a skew correcting section 121, a size correcting section 122 or a skew/size correcting section 123, as shown in FIGS. 3 through 5. Note that the skew correcting section 121, the size correcting section 122, and the skew/size correcting section 123 are not essential components of the image processing apparatus 100 of the present embodiment, and each utilizes the information (extraction result) on the image area extracted by the image area extracting section 110.

The skew correcting section 121 shown in FIG. 3 corrects skew of a document which is skewed at the time of reading of the document by pasting an image area extracted from inputted image data to a rectangular area suitable for a size of the image area, as described in Patent Literature 1 for example. According to such a method, not only skew of a document which occurred at the time of reading of the document, but also skew of an image area (content area) which is skewed with respect to four side of a sheet constituting a document can be corrected.

As described above, the image processing apparatus 100 can accurately identify and extract an image by detecting an image area with the use of a threshold value suitable for a type of inputted image data. Accordingly, in a case where the image processing apparatus 100 is combined with the skew correcting section 121, it is possible to accurately correct not only skew of a document which occurs at a time of reading of the document, but also skew of an image area within the document.

Attribute information for correcting skew of an image is associated with outputted image data outputted by the skew correcting section 121. Based on the attribute information, an image having no skew is displayed or printed.

The size correcting section 122 shown in FIG. 4 corrects, based on a size of the image area in the inputted image data, a size of an image of the inputted image data. Processing of detecting and correcting an image size can be carried out by using any one of various kinds of conventional techniques. Attribute information for correcting an image size is associated with outputted image data outputted by the size correcting section 122. Based on the attribute information, the image is displayed so as to have a size of the image area, and is printed on a sheet suitable for the size of the image area.

The skew/size correcting section 123 shown in FIG. 5 detects skew of a document image by using a conventional technique and corrects, based on the detected skew, skew of an image area extracted from inputted image data. In addition, the skew/size correcting section 123 corrects an image size in a similar way to the size correcting section 122. The skew/size correcting section 123 is described later in detail in an explanation concerning an image forming apparatus 1 provided with functions of the image processing apparatus 100.

As described above, according to the image processing apparatus 100, the image area extracting section 110 identifies and extracts an image area (content area) within a document where an image is present, on the basis of inputted image data obtained by reading the document, and a threshold value used for such image area detection by the image area extracting section 110, more specifically, a threshold value used for detection of an edge of the image area is automatically changed to one suitable for a type of the inputted image data.

This makes it possible to accurately identify and extract an image area without the need for a user to check a type of inputted image data and switch a threshold value for identifying and extracting the image area to one suitable for the type of the inputted image data.

Based on a result of the extraction, image skew correction (document skew correction), image size correction (document size correction), or skew/size correction can be appropriately carried out with respect to the inputted image data if needed. This improves convenience of an apparatus, such as an image forming apparatus (e.g., a copying machine, multi-function printer) or an image reading apparatus, in which the image processing apparatus 100 is mounted.

The following describes an image forming apparatus and an image reading apparatus in which the image processing apparatus 100 is mounted.

Figure 6:
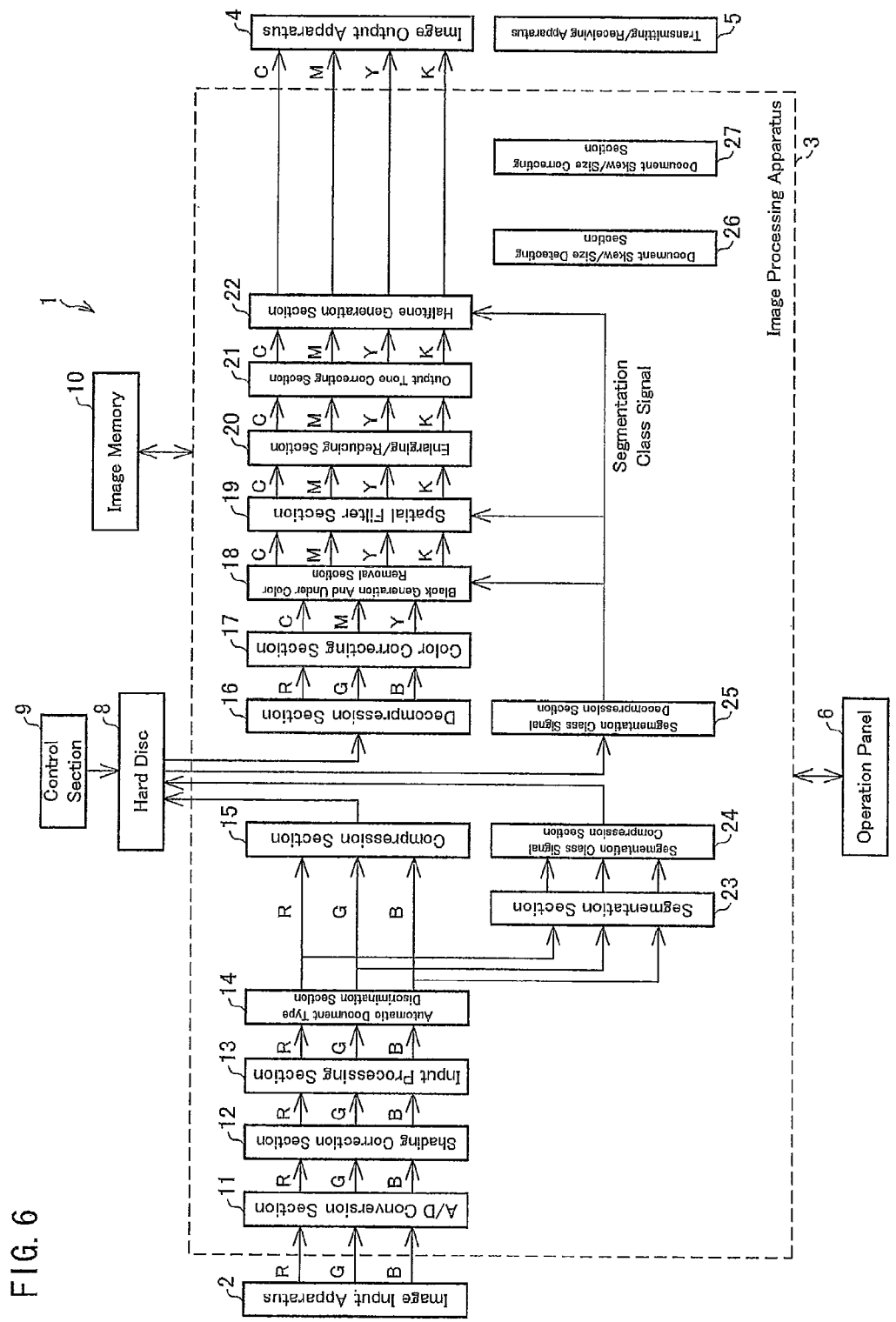
FIG. 6 is a block diagram illustrating a digital color multifunction printer including the image processing apparatus, and shows a flow of data in a so-called copying mode in which an image input apparatus reads a document so as to generate image data and an image output apparatus generates and outputs an image based on the image data.
Figure 7:
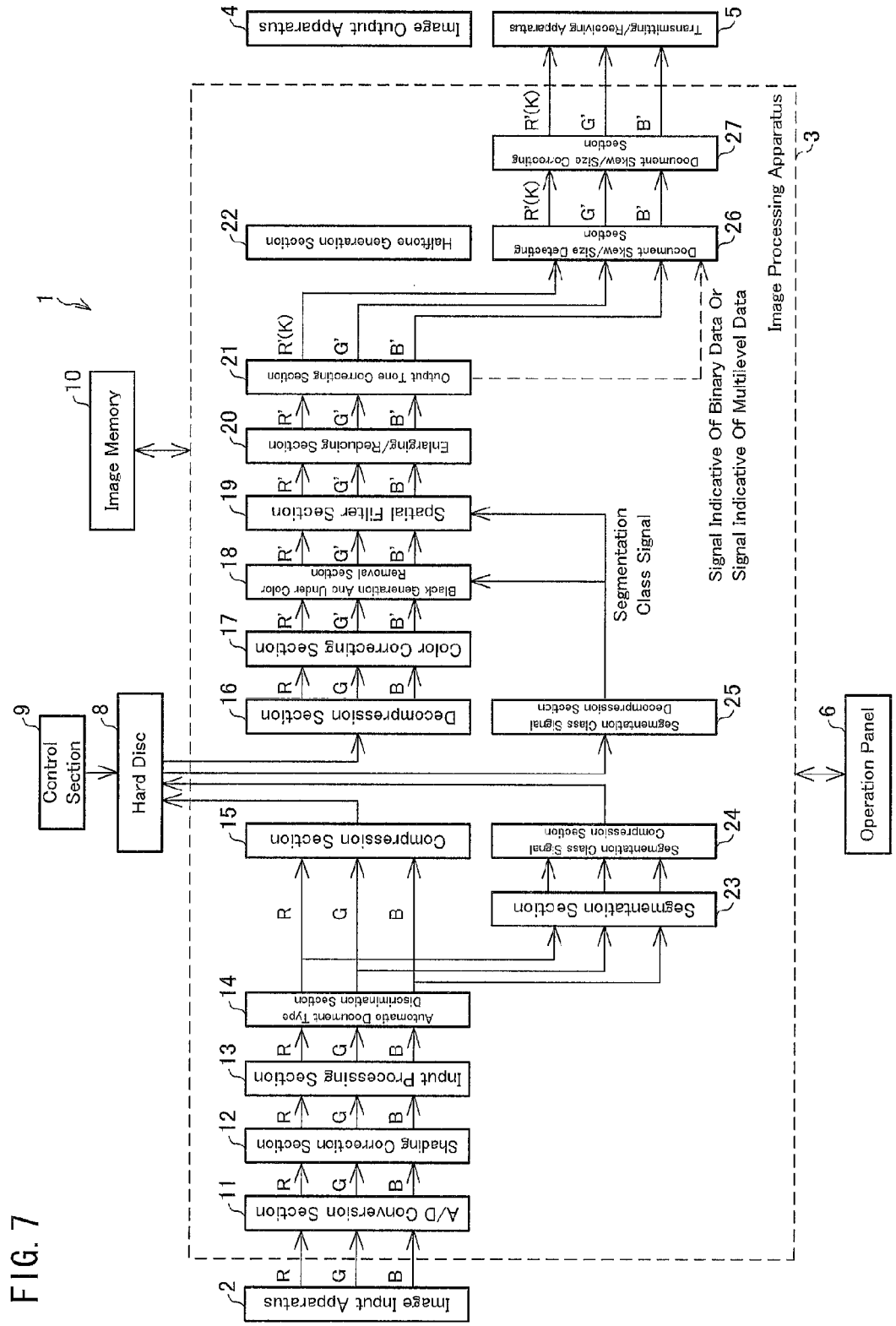
FIG. 7 is a block diagram illustrating a digital color multifunction printer including the image processing apparatus, and shows a flow of data in an image sending mode in which an image input apparatus reads a document so as to generate image data and the image data is sent.

FIGS. 6 and 7 are block diagrams each illustrating a digital color multifunction printer 1 in which the image processing apparatus 100 is mounted. The digital color multifunction printer 1 has functions such as a copying function, a printer function, a facsimile transmitting/receiving function, and an image sending function (e.g., scan to e-mail function).

FIG. 6 shows a flow of data in a so-called copying mode in which an image input apparatus 2 such as a scanner reads a document so as to create image data and an image output apparatus 4 generates and outputs an image based on the image data.

Meanwhile, FIG. 7 shows a flow of data in an image sending mode in which the image input apparatus 2 such as a scanner reads a document image so as to create image data, and the image data (inputted image data) is transmitted, as electronic data, to an address designated by a user. In particular, FIG. 7 shows a flow of data in image sending processing in which a mode for correcting document skew/size (later described) is selected and skew correction and image area extraction are carried out with respect to inputted image data.

As shown in FIG. 6, the digital color multifunction printer 1 includes the image input apparatus 2, an image processing apparatus 3, the image output apparatus 4, a transmitting/receiving apparatus 5, an HDD (hard disc) 8, an image memory 10, and a control section 9. The image processing apparatus 3 has the functions of the image processing apparatus 100.

The image input apparatus 2 is image input means for reading a document so as to create image data in a copying mode, a facsimile transmitting mode or an image sending mode such as a scan to e-mail mode. The image input apparatus 2 includes a scanner section having a CCD (Charge Coupled Device), and converts light reflected from a document into an electric signal (analogue image signal) indicating each color component of R, G, and B of the light, and then supplies the electric signal to the image processing apparatus 3. The image input apparatus 2 reads a document image in full color regardless of whether a full color mode or a black-and-white mode is selected.

The image processing apparatus 3 carries out image processing with respect to image data (image signal). As shown in FIG. 6, the image processing apparatus 3 includes an A/D (analogue/digital) conversion section 11, a shading correction section 12, an input processing section 13, an automatic document type discrimination section 14, a segmentation section 23, a compression section 15, a segmentation class signal compression section 24, a decompression section 16, a segmentation class signal decompression section 25, a color correcting section 17, a black generation and under color removal section 18, a spatial filter section 19, an enlarging/reducing (zooming) section 20, an output tone correcting section 21, and a halftone generation section 22. Processing carried out by these blocks included in the image processing apparatus 3 is described later in detail.

In the copying mode, facsimile sending mode, and image sending mode, the image processing apparatus 3 carries out image processing with respect to image data (inputted image data) which is sent from the image input apparatus 2. In the printing mode, the image processing apparatus 3 carries out image processing with respect to image data which is sent from a terminal device (not shown). In the facsimile receiving mode, the image processing apparatus 3 carries out image processing with respect to image data which is received from an external device (not shown). In the copying mode, printing mode, and facsimile receiving mode, the image processing apparatus 3 transmits, to the image output apparatus 4, the image data that has been subjected to the image processing. In the facsimile sending mode, the image processing apparatus 3 transmits, to the transmitting/receiving apparatus 5, the image data that has been subjected to the image processing.

The HDD 8 is a hard disc in which image data processed in the image processing apparatus 3 is temporarily stored.

The image memory 10 is a memory in which the image data processed in the image processing apparatus 3 is temporarily stored. Processing carried out with respect to an entire image by a document skew/size correcting section 27 is carried out while image data is being stored in the image memory 10. In addition, processing carried out by a document skew/size detecting section 26 in FIG. 6 is also carried out while image data is being stored in the image memory 10.

The image output apparatus 4 prints (forms), on a recording medium (e.g., paper), an image of image data sent from the image processing apparatus 3. The image output apparatus 4 can be, for example, an electrophotographic or ink-jet color printer.

The transmitting/receiving apparatus 5 is, for example, a modem or a network card. The transmitting/receiving apparatus 5 communicates data, via a network card, a LAN cable or the like, with other devices (e.g., a personal computer, a server apparatus, a display device, another digital multifunction printer, a facsimile device) connected to a network. In a case where the transmitting/receiving apparatus 5 transmits image data, the transmitting/receiving apparatus 5 carries out a procedure for transmitting the image data to a destination. While a transmittable state is secured, image data compressed in a predetermined format is read out from a memory (not shown). After the image data is subjected to a necessary process such as conversion of a compression format, the image data is sequentially sent to the destination via a communication line.

Further, in a case where the transmitting/receiving apparatus 5 receives image data, the transmitting/receiving apparatus 5 performs a procedure for communication, and receives image data which is sent from an originating communication apparatus. The image data received is supplied to the image processing apparatus 3. In the image processing apparatus 3, the received image data is subjected to predetermined processes such as a decompression process, a rotation process, a resolution conversion process, an output tone correction, and a tone reproduction process, and is then outputted from the image output apparatus 4. Note that the image data received may be stored in a storage device (not shown), and read out and subjected to the predetermined processes by the image processing apparatus 3 if necessary.

The operation panel 6 has, for example, a display section such as a liquid crystal display (not shown), a setting button (not shown), etc. Information corresponding to an instruction from the control section 9 of the digital color multifunction printer 1 is displayed on the display section, and information inputted by a user with the use of the setting button is supplied to the control section 9. A user can input various kinds of information such as a processing mode for inputted image data, the number of printing, a sheet size, a destination address from the operation panel 6.

The control section 9 is a computer including a processor such as a CPU (Central Processing Unit) or a DSP (Digital Signal Processor), and collectively controls various hardware provided in the digital color multifunction printer 1. Further, the control section 9 has a function controlling data transmission between the hardware provided in the digital color multifunction printer 1. Although the control section 9 is shown as a member provided outside the image processing apparatus 3 in FIG. 6, the control section 9 and the HDD 8 may be provided inside the image processing apparatus 3.

Next, the following describes, in detail, processing executed by the blocks of the digital color multifunction printer 1 in the copying mode and the image sending mode.

First, processing executed by the blocks in the copying mode is described with reference to FIG. 6. As described above, FIG. 6 shows a flow of data in the copying mode.

The A/D (analogue/digital) conversion section 11 converts a color image signal (RGB analogue signal) sent from the image input apparatus 2 into digital image data (RGB digital signal). The shading correction section 12 carries out, with respect to the image data sent from the A/D conversion section 11, processing of removing various distortion generated in an illumination system, an image focusing system, and an image sensing system of the image input apparatus 2. The input processing section 13 carries out tone conversion processing such as gamma correction processing with respect to each of the RGB image data sent from the shading correction section 12.

The automatic document type discrimination section 14 supplies the RGB signals (RGB density (pixel value) signals)) subjected to the processing such as gamma correction in the input processing section 13 to the compression section 15 and the segmentation section 23 as they are, and carries out automatic document type discrimination. Specifically, the automatic document type discrimination section 14 judges a document type, e.g., judges whether a read document is a text document, a printed photograph document or a text/printed photograph document in which a text and a printed photograph are mixed. Further, the automatic document type discrimination section 14 carries out the ACS (Automatic Color Selection) for judging whether a read document is a color document or a black-and-white document, and carries out processing of judging whether a read document is a blank document (solid-color document) or not. A result of the document type discrimination is supplied to the compression section 15.

The compression section 15 encodes the RGB signals supplied from the automatic document type discrimination section 14. As a method for encoding, JPEG (Joint Photographic Experts Group) is used for example. An image data encoded code (encoded image data) supplied from the compression section 15 is temporarily stored in the HDD 8.

The segmentation section 23 judges, based on the RGB signals (RGB density signals) supplied from the automatic document type discrimination section 14, what kind of region each pixel of the inputted image data belongs to. For example, the segmentation section 23 judges which of the regions such as a black text region, a color text region, and a halftone region each pixel of the inputted image data belongs to. The segmentation process may be carried out so that image area judgment is made for each group of pixels, not for each pixel. A result of the judgment is supplied to the segmentation class signal compression section 24.

The segmentation class signal compression section 24 compresses a segmentation class signal judged for each pixel, for example, by using a lossless compression method such as MMR (Modified Modified Reed) or MR (Modified Reed). A segmentation class signal code (encoded segmentation class signal) supplied from the segmentation class signal compression section 24 is temporarily stored in the HDD 8.

The control section 9 associates an address or data name of the image data encoded code stored in the HDD 8 with an address of the segmentation class signal code stored in the HDD 8, and records the associated information in a management table. The control section 9 controls readout of data from the HDD 8 and write of data into the HDD 8 on the basis of the associated information. The image data encoded code supplied from the compression section 15 and the segmentation class signal code supplied from the segmentation class signal compression section 24 are managed as filing data in the HDD 8.

In a case where a copy output operation or a print output operation is instructed, the control section 9 reads out an image data encoded code and a corresponding segmentation class signal code from the HDD 8, and then supplies the image data encoded code and the corresponding segmentation class signal code to the decompression section 16 and the segmentation class signal decompression section 25, respectively.

The decompression section 16 decompresses the image data encoding code, and decompresses the image data encoded code to RGB image data. The segmentation class signal decompression section 25 decompresses the segmentation class signal code. The decompressed segmentation class signal is supplied to the black generation and under color removal section 18, the spatial filter section 19, and the halftone generation section 22. In these blocks, the processing is selected in accordance with the various regions.

The color correcting section 17 carries out a process of removing color impurity in accordance with spectral characteristics of CMY (C: cyan, M: magenta, Y: Yellow) color materials including an unnecessarily absorption component. This allows a faithful color reproduction to be realized.

The black generation and under color removal section 18 carries out a process in which (i) a black (K) signal is generated based on three CMY color signals which have been subjected to a color correction and (ii) new CMY signals are generated by removing, from the original CMY signals, the K signal obtained by the black signal generated. This causes the three CMY signals to be converted into four CMYK signals.

The spatial filter section 19 causes a digital filter to carry out a spatial filter process (an edge enhancement process and/or a smoothing process) in accordance with a segmentation class signal with respect to the image data in the form of the CMYK signals which are supplied from the black generation and under color removal section 18. The spatial filter section 19 corrects a spatial frequency characteristic, so as to allow an output image to have reduced blur or graininess deterioration.

The enlarging/reducing (zooming) section 20 enlarges or reduces an image on the basis of a signal (magnification ratio to a printed image) inputted with the use of the operation panel 6.

The enlarging/reducing (zooming) section 20 enlarges or reduces an image on the basis of a signal (display magnification (e.g., fixed magnification such as 2-fold magnification or 4-fold magnification)) inputted with the use of the operation panel 6.

The output tone correcting section 21 carries out output gamma correction for outputting image data to a recording medium such as paper.

The halftone generation section 22 carries out, with respect to image data of CMYK signals, tone reproduction processing for outputting an image, with the use of error diffusion or dithering on the basis of a segmentation class signal.

For example, in order to improve reproducibility of especially a black text and a color text, a region segmented into a text in the segmentation section 23 is subjected to an edge enhancement process in a spatial filter process of the spatial filter section 19 so that high frequencies are strongly sharpened. Concurrently, in the halftone generation section 22, either binary process or multi-level dithering process in a high-resolution screen suitable for reproducing the high frequencies is selected. With respect to a region segmented into a halftone region by the segmentation section 23, the spatial filter section 19 carries out a low pass filter process for removing input halftone dot components.

The output tone correction section 21 carries out an output tone correction process in which a signal such as the density signal is converted into a halftone dot area rate that is characteristic values of the image output apparatus 4. Subsequently, the halftone generation section 22 carries out a tone reproduction process (halftone generation) in which an image is ultimately segmented into pixels and each tone of the pixels can be reproduced. With respect to a region segmented into a photograph region by the segmentation section 23, the binary process or the multi-level dithering process in a screen suitable for tone reproduction is carried out.

The CMYK signals outputted from the halftone generation section 22 are supplied to the image output apparatus 4. In the image output apparatus 4, a final output image is formed.

Next, the processing executed by the blocks in the image sending mode is described with reference to FIG. 7. As described above, FIG. 7 shows a flow of data in the image sending mode. FIG. 7 shows a case where, in the image sending mode, a mode for carrying out document skew/size correction is selected, and image skew correction and image size correction are carried out with respect to inputted image data by extracting an image area. Since the mode for carrying out document skew/size correction is selected, the document skew/size detecting section 26 and the document skew/size correcting section 27 operate. Although the following describes an example in which the mode for carrying out document skew/size correction is selected in the image sending mode, it is of course possible that the mode for carrying out document skew/size correction is selected in the copying mode.

Figure 8:
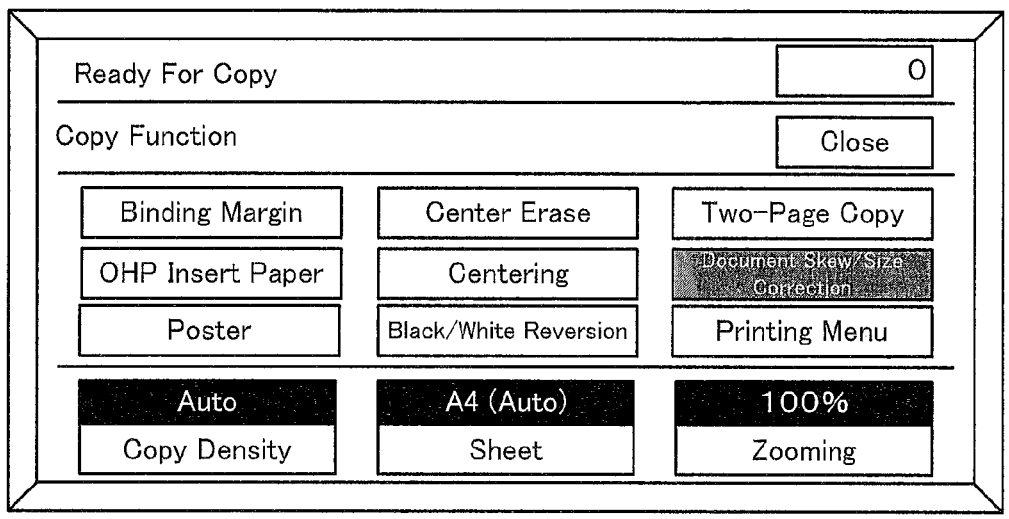
FIG. 8 is a diagram illustrating a window for allowing a user to select various menus of a copy function.
Figure 9:
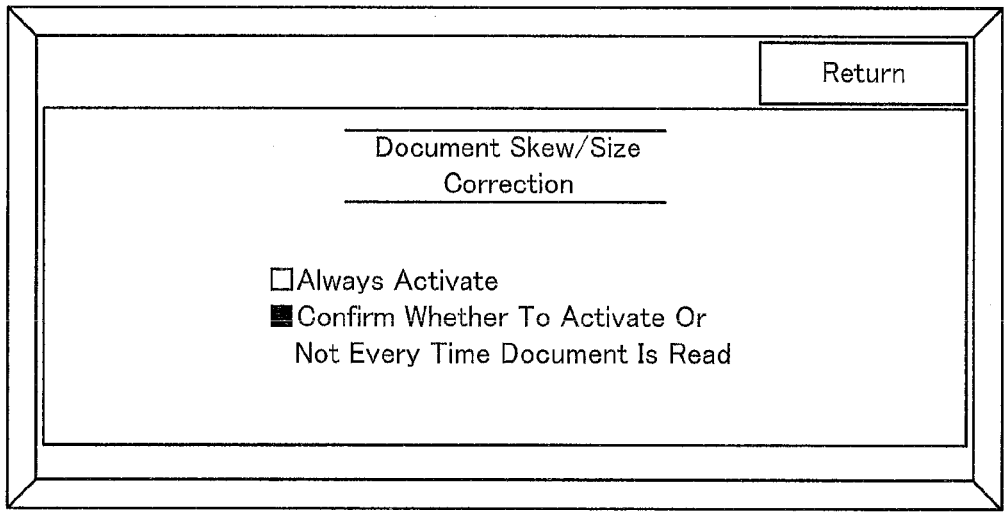
FIG. 9 is a diagram illustrating a window for allowing a user to select setting for a document skew/size correcting function.

The mode for carrying out document skew/size correction can be selected, for example, with the use of the operation panel 6. FIG. 8 shows initial menus for a copy function displayed on LCD which is for carrying out the "document skew/size correction" function. When "document skew/size correction" is selected in the menus for the copy function, a menu screen 1 is displayed first as shown in FIG. 9. The menu screen 1 is a screen for requesting a user to select whether to "always activate" this function or to "confirm whether to activate or not every time document is read". In a case where "always activate" is selected, the document skew/size detecting section 26 and the document skew/size correcting section 27 shown in FIGS. 6 and 7 always operate when any function, such as a copying function or an image sending function, for reading a document is used.

A process in which the image data read by the image input apparatus 2 is supplied to the A/D conversion section 11 of the image processing apparatus 3, and is then supplied to the decompression section 16 and the segmentation class signal decompression section 25 in FIG. 7 is the same as that in the copying mode, and therefore is not explained repeatedly.

The color correcting section 17 converts the image data into R'G'B' image data (e.g., sRGB data) suitable for display characteristics of a widely used display device. The color correcting section 17 converts RGB signals into R'G'B' signals on the basis of display characteristics of an image display device to which the image data is supplied, and supplies the R'G'B' signals to the black generation and under color removal section 18. The black generation and under color removal section 18 supplies the image data supplied from the color correcting section 16 to the spatial filter section 19 as it is (without subjecting the image data to any process). The spatial filter section 19 carries out edge enhancement processing and smoothing processing with respect to the R'G'B' signals.

The enlarging/reducing (zooming) section 20 enlarges or reduces an image on the basis of a signal (display magnification (e.g., fixed magnification such as two-fold magnification or four-fold magnification)) inputted with the use of the operation panel 6.

The output tone correcting section 21 carries out output gamma correction for image data display. Here, a binary signal (K) is outputted in a case where a monochromatic binary mode is designated as a color mode for an output image on the operation panel 6. As described above, the monochromatic binary mode is designated, for example, by selecting a black-and-white binary mode on the operation panel from among color modes such as a full color mode, an automatic mode (automatic color selection (ACS)), a grayscale mode (black-and-white multilevel mode), a black-and-white binary mode, a single color mode, and a two-color mode. It is also possible that an output mode (a multilevel output mode and a binary output mode) is designated in addition to a color mode and the color mode and the output mode are combined. For example, it is possible that the single color mode and the binary output mode are selected so that an outputted color is designated and binary image data is outputted. Alternatively, it is also possible that the automatic mode and the binary output mode are selected so that binary image data is outputted in a case where it is determined as a result of the automatic color selection that image data is monochromatic image data. A threshold value used to determine whether binarization is carried out or not is set to 128 in a case where image data is 8-bit image data. Alternatively, it is also possible that an average value of a pixel block (e.g., 3×3 pixels) constituted by a plurality of pixels is used as a threshold value and a target pixel in the block is binarized. In a case where grayscale is selected as the color mode, a multilevel K signal is outputted. The above description has dealt with a case where the binarization process is carried out in the output tone correcting section 21, but the binarization process may be carried out in the halftone generation section 22.

The RGB signal or K signal that has been subjected to the output tone correction in the output tone correcting section 21 is stored in the image memory 10, and is also supplied to the document skew/size detecting section 26 since the mode for document skew/size correction is designated.

With respect to the RGB signal or K signal image data supplied from the output tone correcting section 21, the document skew/size detecting section (size detecting section) 26 extracts an edge of a document and calculates correction parameters (skew angle, image size after correction, correction start position).

The document skew/size correcting section (size correcting section) 27 carries out document skew/size correction with respect to the image data stored in the image memory 10 with the use of the correction parameters calculated by the document skew/size detecting section 26. Alternatively, another arrangement is possible in which attribute information concerning skew correction and size correction is added to the image data instead of carrying out the skew correction and size correction.

Next, the document skew/size detecting section 26 and the document skew/size correcting section 27 are described in detail with reference to FIGS. 10 through 16.

Figure 10:
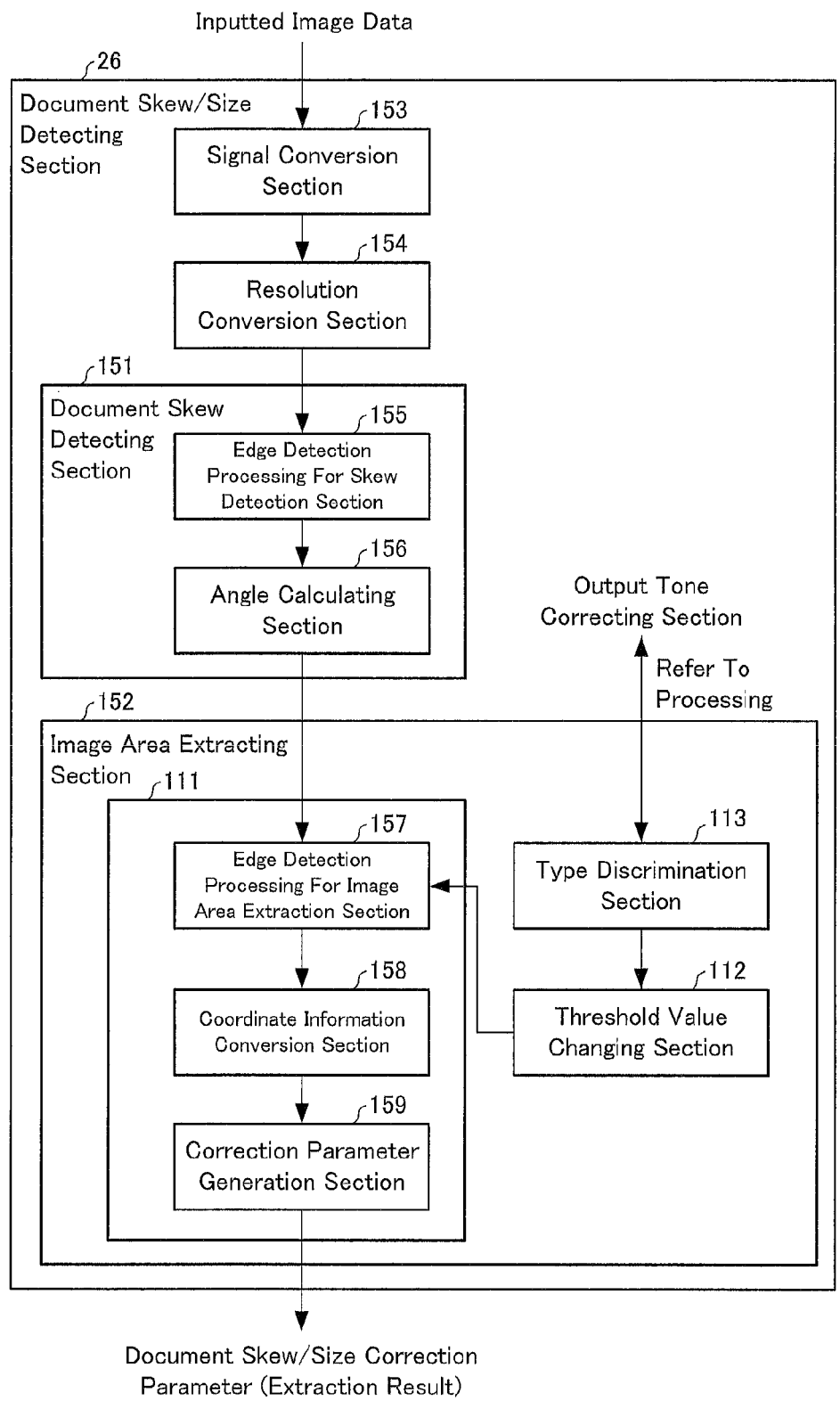
FIG. 10 is a block diagram illustrating a configuration of a document skew/size detecting section provided in the digital color multifunction printer.
Figure 14:
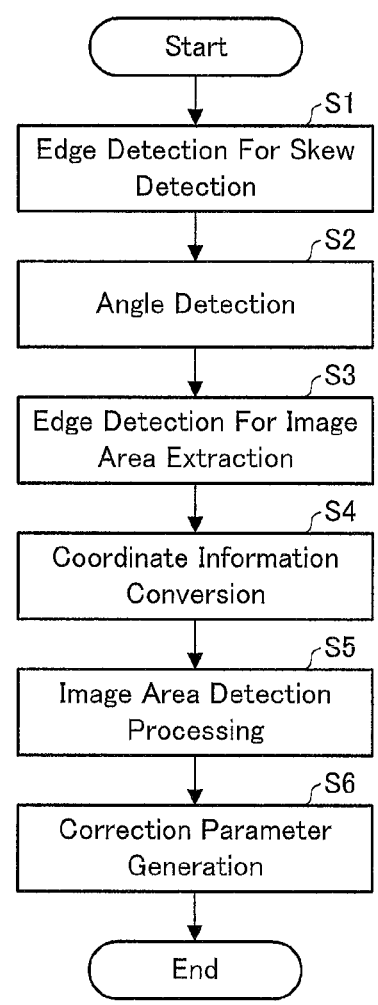
FIG. 14 is a flow chart showing a procedure for document skew/size detection processing carried out by the document skew/size detecting section.

First, the document skew/size detecting section 26 is described with reference to FIGS. 10 through 14. FIG. 10 is a block diagram illustrating a detailed configuration of the document skew/size detecting section 26. FIG. 14 is a flow chart showing a procedure (only a substantial part) for the document skew/size detecting processing carried out in the document skew/size detecting section 26.

As shown in FIG. 10, the document skew/size detecting section 26 includes a signal conversion section 153, a resolution conversion section 154, a document skew detecting section 151, and an image area extracting section 152.

In a case where inputted image data is color image data in the form of RGB signals, the signal conversion section 21 achromatizes and converts the inputted image data into a brightness signal or a luminance signal. The inputted image data can be converted into a luminance signal, for example, with the use of the following equation:

$$Yi = 0.30Ri + 0.59Gi + 0.11Bi$$

where Y is a luminance signal of each pixel, and R, G, and B are color components of RGB signals of each pixel. The suffix "i" is a value given to each pixel (i is an integer equal to or larger than 1). In a case where the inputted image data is converted into a brightness signal, the inputted image data in the form of RGB signals are achromatized and converted into CIE1976L*a*b* signal (CIE: Commission International de l'Eclairage, L*: brightness, a*, b*: chromaticity).

In a case where the inputted image data is monochromatic image data in the form of the K signal, the signal conversion section 153 converts the inputted image data into a luminance signal by substituting, in a case where an input pixel is a black pixel, 0 for the luminance Y and substituting, in a case where an input pixel is a white pixel, 255 for the luminance Y.

The resolution conversion section 154 carries out resolution conversion so that the inputted image data (resolution is, for example, 1200 dpi, 600 dpi or 300 dpi) which is converted into a luminance signal or a brightness signal and is supplied from the signal conversion section 153 has resolution (resolution for detection) suitable for detection processing. The resolution for detection is predetermined resolution (e.g., 75 dpi) optimum for the document skew/size detection. A method for the resolution conversion is not limited to a specific one, and can be, for example, a known method such as a nearest neighbor method, a bilinear method, or a bicubic method.

The document skew detecting section 151 detects, based on the inputted image data, skew of a document which occurs when the document is read (document skew at the time of reading). The document skew detecting section 151 includes an edge detection processing for skew detection section 155 and an angle calculating section 156.

The edge detection processing for skew detection section 155 distinguishes, on the basis of the inputted image data whose resolution has been reduced in the resolution conversion section 154, an image part obtained by reading a document and an image part obtained by reading a background part except the document so as to detect the image part obtained by reading the document, i.e., an edge of a document image (process in S1 in the flow chart of FIG. 14).

Specifically, with respect to the image data for detection supplied from the resolution conversion section 154, a pixel position at which a pixel value of an adjacent pixel is larger than a threshold value (value (e.g., 3) by which a boundary between a document background and a document area can be detected) is extracted, for each line, as an edge of the document image.

Next, a leftmost pixel coordinate of an extracted edge image in an X-axis direction is extracted as a first left edge coordinate ($L''_X$, $L''_Y$) and a rightmost pixel coordinate of the extracted edge image in the X-axis direction is extracted as a first right edge coordinate ($R''_X$, $R''_Y$) as shown in FIG. 11(a). The number of obtained coordinates M depends on a size of the resolution for detection in a longitudinal direction. Similarly, a top pixel coordinate in a Y-axis direction is extracted as a first top edge coordinate ($T''_X$, $T''_Y$) and a bottom pixel coordinate in the Y-axis direction is extracted as a first bottom edge coordinate ($B''_X$, $B''_Y$) as shown in FIG. 11(b). The number of obtained coordinates N depends on a size of the resolution for detection in a lateral direction.

The angle calculating section 156 calculates document skew (angle) on the basis of the edge coordinates of the document image which are detected by the edge detection processing for skew detection section 155 (process in S2 in the flow chart of FIG. 14). The document skew angle can be calculated by using any one of various kinds of conventional methods. The following description deals with a case where the skew detection method described in Patent Literature 5 is used.

The angle calculating section 156 detects, on the basis of the detected edge coordinates, a change of skew in coordinate data of the respective document edges, finds points (edge change points) at which the skew changes, and extracts line segments connecting the edge change points.

Next, the longest line segment is selected from line segments skewed at 45° to the X-axis direction (sub-scanning direction) out of the extracted line segments, and the skew of the document is calculated on the basis of a start coordinate (StartX", StartY") and an end coordinate (EndX", EndY") of the longest line segment.

In this case, the following equation is satisfied:

$$\tan \alpha = (EndY'' - StartY'')/(EndX'' - StartX'') \quad (1)$$

where α is a skew angle of the document. The angle α corresponding to this value is read from the table created in advance as shown in FIG. 12 for example.

The image area extracting section 152 identifies and extracts, on the basis of the inputted image data, an image area (content area) within the document where an image (content) is present. The image area extracting section 152 is constituted by the image area extracting section 110 shown in FIG. 1.

The image area extracting section 152 includes an edge detection processing for image area extraction section 157, a coordinate information conversion section 158, a correction parameter generation section 159, a threshold value changing section 112, and a type discrimination section 113. The image area detecting section 111 of the image area extracting section 152 shown in FIG. 1 is constituted by the edge detection processing for image area extraction section 157, the coordinate information conversion section 158, and the correction parameter generation section 159.

The edge detection processing for image area extraction section 157 detects, on the basis of the inputted image data whose resolution has been reduced by the resolution conversion section 154, an edge of the image area (content area) within the document where an image (content) is present (the process in S3 in the flow chart of FIG. 14). The edge detection processing for image area extraction section 157 carries out similar processing to that carried out by the edge detection processing for skew detection section 155.

Specifically, with respect to the image data for detection supplied from the resolution conversion section 154, the edge detection processing for image area extraction section 157 extracts, for each line as an edge of the image area, a pixel position where a pixel value of an adjacent pixel is larger than a threshold value.

Next, a leftmost pixel coordinate of an extracted edge image in an X-axis direction is extracted as a second left edge coordinate ($L_X$, $L_Y$) and a rightmost pixel coordinate of the extracted edge image in the X-axis direction is extracted as a second right edge coordinate ($R_X$, $R_Y$) as shown in FIG. 13(a).

The number of obtained coordinates M depends on a size of the resolution for detection in a longitudinal direction. Similarly, a top pixel coordinate in a Y-axis direction is extracted as a second top edge coordinate ($T_X$, $T_Y$) and a bottom pixel coordinate in the Y-axis direction is extracted as a second bottom edge coordinate ($B_X$, $B_Y$) as shown in FIG. 13(b). The number of obtained coordinates N depends on a size of the resolution for detection in a lateral direction.

A notable arrangement is that the threshold value used for detection of an edge of an image area is changed depending on a type of inputted image data. The image area extracting section 152 changes a predetermined threshold value (document area extraction parameter) in accordance with a type of an inputted image (whether the inputted image is a color image, a grayscale image or a monochromatic binary image).

Such threshold value changing processing is carried out by the type discrimination section 113 and the threshold value changing section 112. The type discrimination section 113 can judge, with reference to the processing in the output tone correcting section 21, whether image data is multilevel image data or binary image data. Specifically, the type discrimination section 113 can judge whether image data is multilevel image data or binary image data, on the basis of (i) information on a color mode designated by a user with the use of the operation panel 6 or (ii) a judgment result of the automatic color selection (ACS) for automatically judging whether an image is a color image or not and a judgment result of the automatic document type discrimination processing.

The judgment result as to whether the image data is multilevel image data or binary image data is supplied to the threshold value changing section 112. In a case where the image data is multilevel image data, the threshold value changing section 112 changes a threshold value used for edge detection carried out by the edge detection processing for image area extraction section 157 to a threshold value suitable for the multilevel image data. Meanwhile, in a case where the image data is binary image data, the threshold value changing section 112 changes the threshold value used for edge detection to a threshold value suitable for the binary image data.

As described above, in the present embodiment, the threshold value changing section 112 has three parameters, i.e., the image area detection parameter, conversion parameter for binary image data, and conversion parameter for multilevel image data, and changes a conversion parameter to be combined with the image area detection parameter in accordance with the judgment result of the type discrimination section 113.

In a case where the inputted image data is multilevel image data such as color image data or grayscale image data, the threshold value is calculated by adding the conversion parameter for multilevel image data to the image area detection parameter. Meanwhile, in a case where the inputted image data is monochromatic binary image data, the threshold value is calculated by adding the conversion parameter for binary image data to the image area detection parameter.

The coordinate information conversion section 158 obtains coordinate information corrected with the angle α calculated in the angle calculating section 156 with respect to all of the edge coordinates detected by the edge detection processing for image area extraction section 157, i.e., the second left edge coordinate ($L_X$, $L_Y$), the second right edge coordinate ($R_X$, $R_Y$), the second top edge coordinate ($T_X$, $T_Y$), and the second bottom edge coordinate ($B_X$, $B_Y$) (process in S4 in the flow chart of FIG. 14).

In the present embodiment, the coordinate information corrected with the angle α calculated in the angle calculating section 156 is obtained with the use of the following equation (2). Thus, a corrected edge coordinate (X', Y') is obtained.

$$\begin{pmatrix} X' \\ Y' \end{pmatrix} = \begin{pmatrix} \cos\alpha & -\sin\alpha \\ \sin\alpha & \cos\alpha \end{pmatrix} \begin{pmatrix} X \\ Y \end{pmatrix} \qquad (2)$$

The coordinate information conversion section 158 calculates a second left corrected edge coordinate ($L'_X$, $L'_Y$), a second right corrected edge coordinate ($R'_X$, $R'_Y$), a second top corrected edge coordinate ($T'_X$, $T'_Y$), and a second bottom corrected edge coordinate ($B'_X$, $B'_Y$), as shown in FIG. 13(a) and FIG. 13(b).

The correction parameter generation section 159 calculates, on the basis of the corrected edge coordinates calculated by the coordinate information conversion section 158, an image area start coordinate (ConStartXX, ConStartYY) and height and width of the image area so as to generate correction parameters (processes in S5 and S6 in the flow chart of FIG. 14).

The image area start coordinate (ConStartXX, ConStartYY) is obtained by converting a minimum value (MinX') of an X-coordinate and a minimum value (MinY') of a Y-coordinate of the corrected edge coordinate (X', Y') into coordinate values in an actual coordinate system with the use of the following equation (3):

$$\begin{pmatrix} constantXX \\ constantYY \end{pmatrix} = \begin{pmatrix} \cos\alpha & \sin\alpha \\ -\sin\alpha & \cos\alpha \end{pmatrix} \begin{pmatrix} MinX' \\ MinY' \end{pmatrix} \qquad (3)$$

The height of the image area is obtained by subtracting the minimum value of the Y-coordinate of the corrected edge coordinate from a maximum value of the Y-coordinate of the corrected edge coordinate. The width of the image area is obtained by subtracting the minimum value of the X-coordinate of the corrected edge coordinate from a maximum value of the X-coordinate of the corrected edge coordinate.

The image area start coordinate (ConStartXX, ConStartYY), the height and width of the image area, and the angle information detected by the angle calculating section are used as the correction parameters, and are outputted as detection information after being converted into values suitable for resolution of an image for correction.

In the present embodiment, instead of a fixed size, height and width of the corrected image area obtained in the above processing are used as an output size of an image in image sending processing.

Alternatively, a fixed-size sheet which encompasses the corrected image area may be used as an output size and the image area start coordinate may be converted so that the image area is located at a center of the output size. In this case, it is necessary to prepare a sheet size table for each output resolution. FIG. 15 shows an example of a sheet size table prepared in a case where resolution is 300 dpi.

First, a minimum sheet size which encompasses the whole of the calculated image area is set as an output sheet size. For example, in a case where the width of the image area and the height of the image area calculated in a case where the resolution is 300 dpi are 2000 and 3200, respectively, sheet sizes larger than the image area are narrowed down to A3, B4, and A4. Since A4 is the minimum sheet size among A3, B4, and A4, A4 is selected as a sheet size. Note that the number of pixels in the output sheet size table is set so that the sheet size is larger than an actual size by approximately 10 mm, in consideration of an error in a result of size detection.

The image area start coordinate (ConStartXX, ConStartYY) is calculated again on the basis of the selected sheet size so that the image area is located at a center of the sheet size.

The image area start coordinate (ConStartXX', ConStartYY') calculated again is obtained by the following equations (4) and (5):

$$\text{CorrEdgeMin}XX' = \text{CorrEdgeMin}XX - (\text{sheet size width} - \text{image area width}) \div 2 \quad (4)$$

$$\text{CorrEdgeMin}YY' = \text{CorrEdgeMin}YY - (\text{sheet size height} - \text{image area height}) \div 2 \quad (5)$$

The document skew/size detecting section 26 supplies, to the document skew/size correcting section 27, "document skew angle α", "image area size after document skew/size correction (hereinafter referred to as "corrected image size") ", and "correction start coordinate" as correction parameters.

Next, skew/size correction processing carried out in the document skew/size correcting section 27 is described. In the present embodiment, for example, processing such as affine transformation using a rotation matrix can be used as the skew/size correction processing. The affine transformation is described below in detail.

A coordinate (x', y') obtained by rotating a coordinate (x, y) by θ is generally obtained from the following equation (6):

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x \\ y \end{pmatrix} \quad (6)$$

A pixel value Z of the pixel (x', y') (a coordinate value of the pixel (x', y') is an integer (see FIG. 16)) is found from a pixel value Z of a pixel (xs+StartX, ys+StartY) (xs+StartX and ys+StartY are real numbers), where the pixel (xs+StartX, ys+StartY) indicates the pixel (x, y) obtained before the rotation. The pixel value Z of the pixel (xs+StartX, ys+StartY) is found by interpolation calculation such as a bilinear method.

Specifically, the pixel (xs+StartX, ys+StartY), which is obtained before the rotation, can be determined based on the following equation (7) which is an inverse transformation of the equation (6).

$$\begin{pmatrix} xs \\ ys \end{pmatrix} = \begin{pmatrix} \cos\theta & \sin\theta \\ -\sin\theta & \cos\theta \end{pmatrix} \begin{pmatrix} x' \\ y' \end{pmatrix} \quad (7)$$

Figure 16:
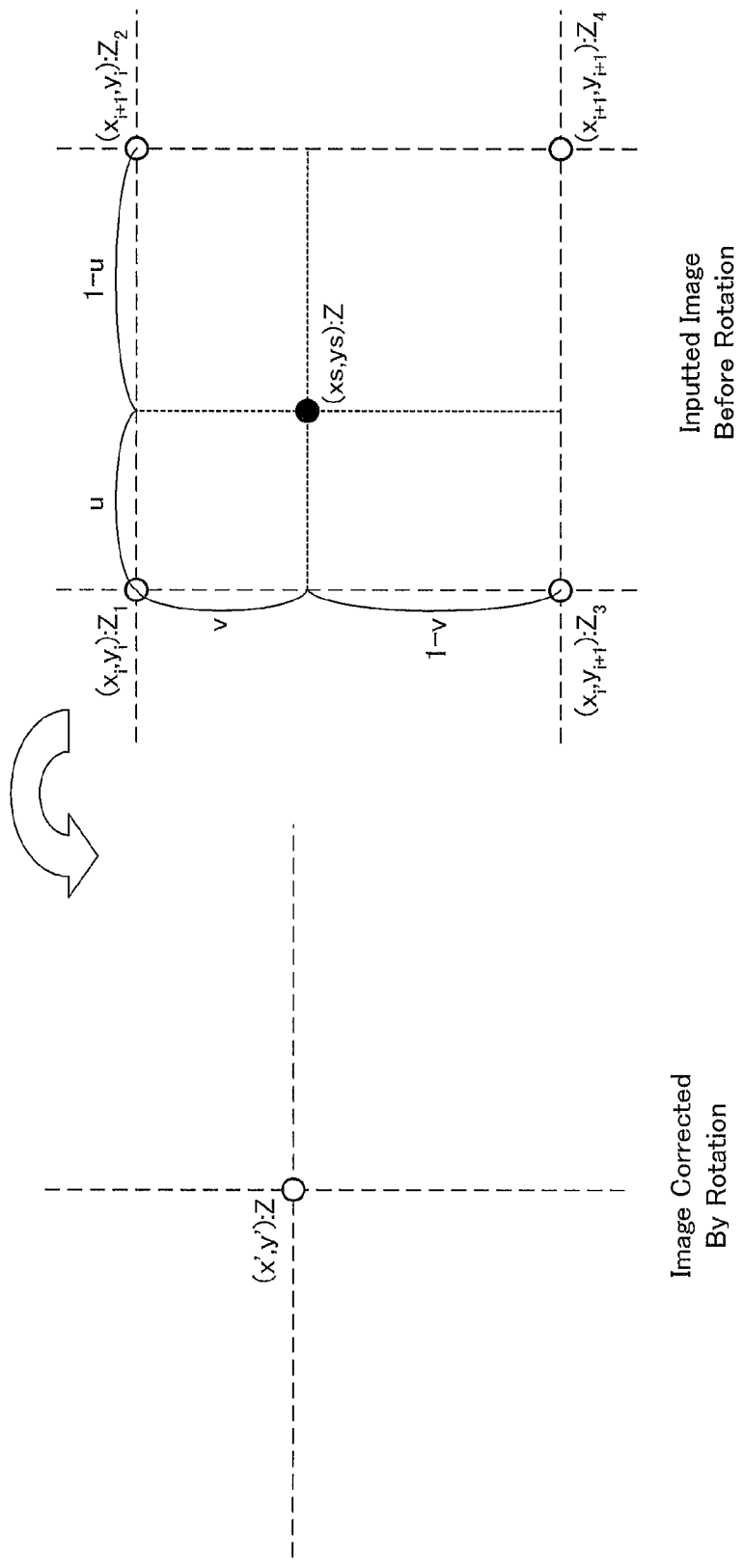
FIG. 16 is an explanatory view showing affine transformation used in the document skew/size correcting section of the digital color multifunction printer.

Then, the pixel value Z of the pixel (xs+StartX, ys+StartY), i.e., the pixel value Z of the pixel (x', y') can be found by respectively assigning, to $Z_1$ through $Z_4$ in the following equation (8), pixel values of respective pixels $(x_i, y_j)$, $(x_{i+1}, y_j)$, $(x_i, y_{j+1})$, and $(x_{i+1}, y_{j+1})$ which pixels are located around the pixel (xs+StartX, ys+StartY) in an x-y coordinate system of an image obtained before the rotation (see FIG. 16). Note that $x_i \leq xs + \text{StartX} < x_{i+1}$, $y_j \leq ys + \text{StartY} < y_{j+1}$, $|x_{i+1} - xs|:|xs - x_i| = (1-u):u$ and $|y_{j+1} - ys|:|ys - y_j| = (1-v):v$ are satisfied (u and v are values which fall in a range from not less than 0 to less than 1).

$$Z_{(x',y')} = Z_{(xs,ys)} = (1-v)\{(1-u)Z_1 + uZ_2\} + v\{(i-u)Z_3 + uZ_4\} \quad (8)$$

Note that calculation can be speeded up if values of a trigonometric ratio (sine values, cosine values) used in the affine transformation are stored in a table as shown in FIG. 12. As to the pixel (x', y') corrected by rotation, 0≤x'<corrected image width and 0≤y'<corrected image height are satisfied.

Another arrangement is possible in which the document skew/size detecting section 26 and the document skew/size correcting section 27 in the image processing apparatus 3 are realized on another computer by way of software as executed by a processor such as a CPU.

Figure 17:
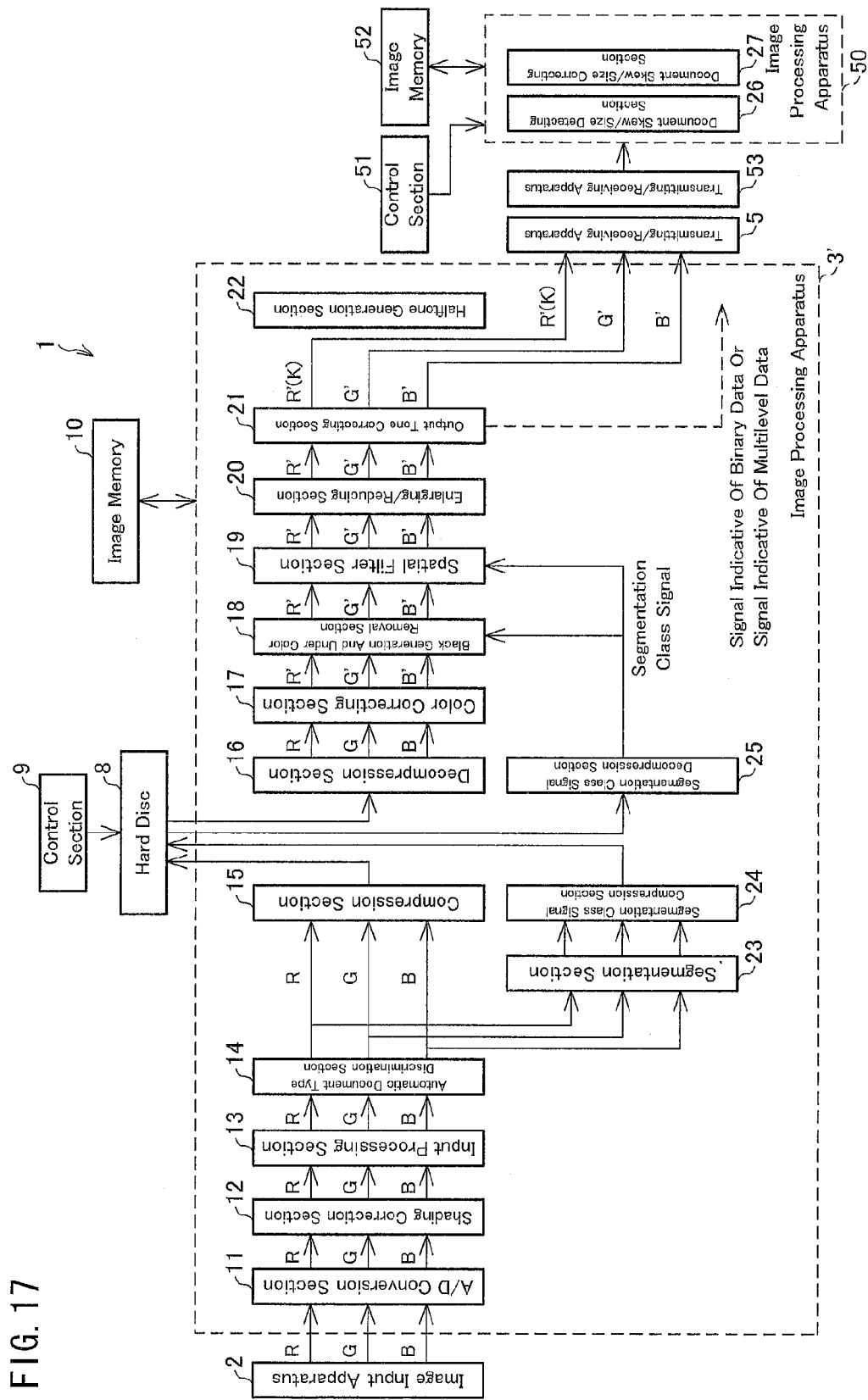
FIG. 17 is a block diagram illustrating a configuration in which the document skew/size detecting section and the document skew/size correcting section are provided in a computer different from the digital color multifunction printer shown in FIG. 7.

FIG. 17 shows an example in which the document skew/size detecting section 26 and the document skew/size correcting section 27 are realized in a computer different from an image processing apparatus 3'. The document skew/size detecting section 26 and the document skew/size correcting section 27 constitute an image processing apparatus 50.

An image memory 52 is a memory which replaces the image memory 10 and is for temporarily storing image data handled by the image processing apparatus 50. A control section 51 is a processor such as CPU (Central Processing Unit) or DSP (Digital Signal Processor).

In such an arrangement, data exchange between the image processing apparatus 3' and the image processing apparatus 50 realized by another computer is carried out in the form of an image file (e.g., PDF, TIFF format). A transmitting/receiving apparatus 53 is a transmitting/receiving apparatus which allows such data exchange to be carried out. In such an arrangement, in the document skew/size detecting section 26, it is determined, on the basis of attribute information embedded in an image file, whether image data is multilevel image data or binary image data.

Data processed in the image processing apparatus 50 is sent to a destination by the transmitting/receiving apparatus 53 or once sent back to the transmitting/receiving apparatus 5 and is then sent by the transmitting/receiving apparatus 5.

Figure 18:
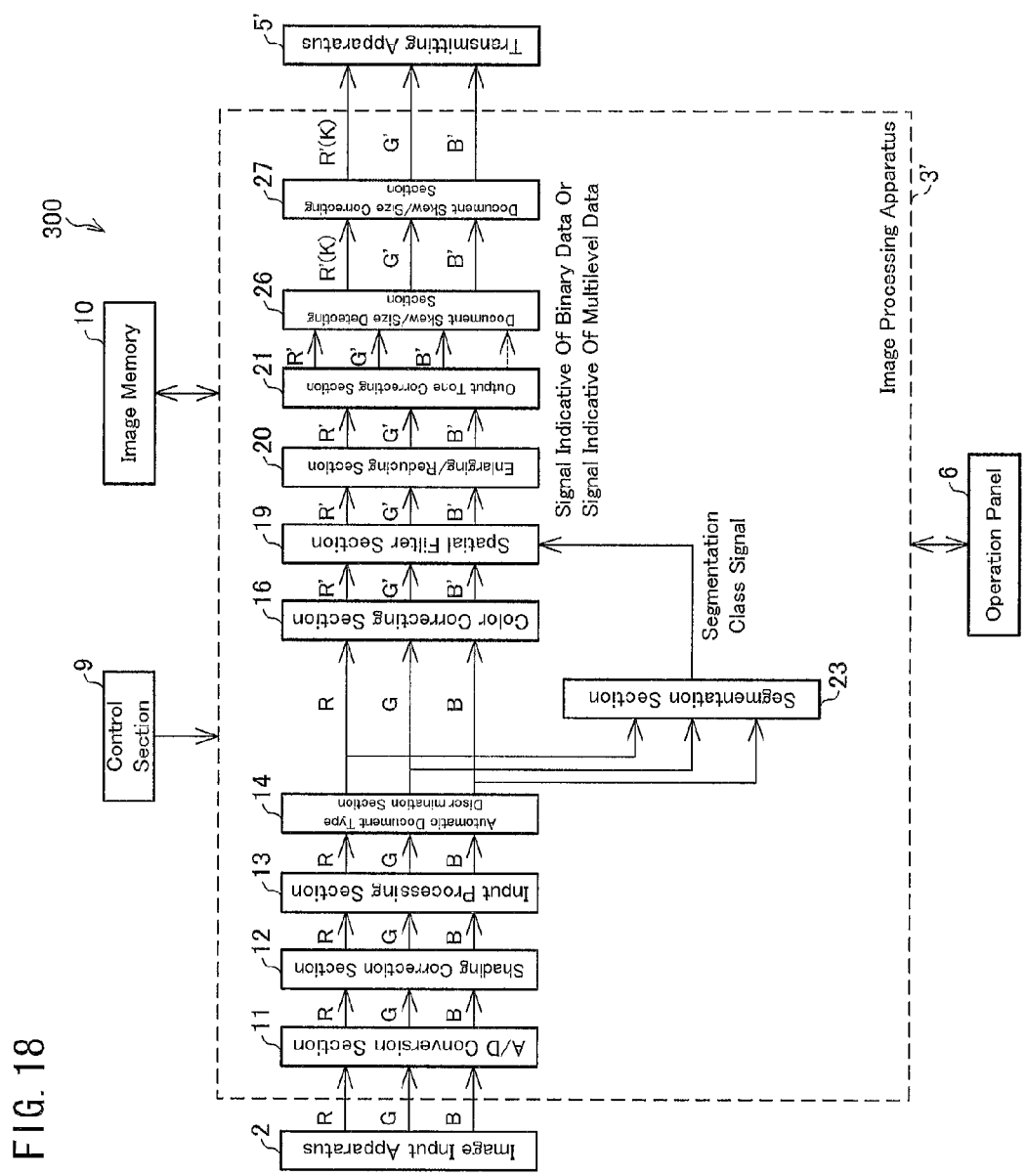
FIG. 18 is a block diagram illustrating a digital color scanner including the image processing apparatus.

The image processing apparatus 100 may be applied to, for example, a single-function image reading apparatus. FIG. 18 shows a configuration of a digital color scanner 300 including the image processing apparatus 100.

As shown in FIG. 18, the digital color scanner 300 (image reading apparatus) includes an image input apparatus 2, an image processing apparatus 3', a transmitting apparatus 5', a control section 9', and an operation panel 6. The digital color scanner 300 includes no hard disc. Configurations and functions of the image input apparatus 2 and the operation panel 6 are substantially the same as those in the digital color multifunction printer 1, and therefore are not explained repeatedly. The transmitting apparatus 5' is configured to have only a transmitting function of the transmitting/receiving apparatus 5. The image processing apparatus 100 is provided in the image processing apparatus 3'.

The image processing apparatus 3' includes an A/D conversion section 11, a shading correction section 12, an input processing section 13, an automatic document type discrimination section 14, a segmentation section 23, a color correcting section 16, a spatial filter section 19, an enlarging/reducing (zooming) section 20, an output tone correcting section 21, a document skew/size detecting section 26, and a document skew/size correcting section 27. The image processing apparatus 3' is different from the image processing apparatus 3 in that the image processing apparatus 3' does not include the compression section 15, the segmentation class signal compression section 24, the decompression section 16, the segmentation class signal decompression section 25, and the black generation and under color removal section 18. However, except for this point, the image processing apparatus 3' operates the same way as the image processing apparatus 3. The control section 9' controls the image processing apparatus 3' in the same way as the control section 9.

Image data subjected to the above processing in the image processing apparatus 3' is supplied, by the transmitting apparatus 5', to a computer or a server which is connected to the image processing apparatus 3' so that it can communicate with the image processing apparatus 3' via a network.

In the above embodiment, each section (each block) of the image processing apparatus 100, the digital color multifunction printer 1, and the digital color scanner 300 may be realized by way of software as executed by a processor such as a CPU. In this case, the image processing apparatus 100, the digital color multifunction printer 1, and the digital color scanner 300 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the image processing apparatus 100, the digital color multifunction printer 1, and the digital color scanner 300 a computer-readable storage medium containing control program code (executable program, intermediate code program, or source program) for the image processing apparatus 100, the digital color multifunction printer 1, and the digital color scanner 300, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The image processing apparatus 100, the digital color multifunction printer 1, and the digital color scanner 300 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which the program code is embodied electronically.

The image processing apparatus 100, the digital color multifunction printer 1, and the digital color scanner 300 each is not limited to one realized by way of software, and can be realized (i) by way of hardware or (ii) by a combination of hardware which carries out part of processing and computing means for executing software which controls the hardware and carries out remaining processing.

As described above, an image processing apparatus of the present invention includes image area extracting means for identifying and extracting, on a basis of inputted image data obtained by reading a document with use of an image input apparatus, an image area within the document where an image is present, the image area extracting means including image area detecting means for comparing a pixel value of each part of an image of the inputted image data with a threshold value so as to detect, as the image area, an area where a pixel value is larger than the threshold value, and the image area extracting means further including discrimination means for judging a type of the inputted image data, and threshold value changing means for changing the threshold value used in the image area detecting means to one suitable for the type of the inputted image data in accordance with the type judged by the discrimination means.

According to the arrangement, the threshold value used in the image area detecting means is automatically changed in accordance with the type of the inputted image data even if a user himself does not change it. This makes it possible to accurately identify and extract an image area with the use of an appropriate threshold value without the need for the user to pay attention to the type of the inputted image data.

The image processing apparatus may be arranged such that the image area detecting means includes image area edge detection means for comparing each pixel value of the image of the inputted image data with a threshold value so as to detect an edge of the image area.

The image processing apparatus may be arranged such that the discrimination means judges whether the inputted image data is binary image data or multilevel image data, and in a case where the inputted image data is binary image data, the threshold value changing means changes the threshold value to a value larger than that in a case where the inputted image data is multilevel image data.

The image processing apparatus may be arranged to further include: size detecting means for detecting a size of the image in the inputted image data on a basis of information on the image area extracted by the image area extracting means; and size correcting means for carrying out correction of a size to be outputted, with respect to the inputted image data on a basis of the size of the image detected by the size detecting means.

According to the arrangement, the size detecting means detects a size of the image (size of the image area) of the inputted image data on the basis of information on the extracted image area, and the image size correcting means carries out correction of a size to be outputted, with respect to the inputted image data on the basis of the size of the image.

This makes it possible to correct a size of an image even in a case where the image size is disproportionate to a document size (e.g., the image (image area) is small when compared with the document size).

The present invention encompasses an image forming apparatus and an image reading apparatus including the image processing apparatus of the present invention.

A image processing method of the present invention includes the step of (a) identifying and extracting, on a basis of inputted image data obtained by reading a document with use of an image input apparatus, an image area within the document where an image is present, the step (a) including (b) comparing a pixel value of each part of an image of the inputted image data with a threshold value so as to detect, as the image area, an area where a pixel value is larger than the threshold value, and the step (a) further including (c) judging a type of the inputted image data and (d) changing the threshold value used in the step (b) to one suitable for the type of the inputted image data before the step (b) in accordance with the type judged in the step (c).

In the image processing method, the type of the inputted image data is judged in the step (c), and the threshold value used in the step (b) is changed to one suitable for the type of the inputted image data in the step (d) in accordance with the type of the inputted image data judged in the step (c). Accordingly, in the step (b), the image area can be detected with the use of the threshold value suitable for the type of the inputted image data.

This makes it possible to accurately identify and extract an image area with the use of an appropriate threshold value without the need for the user to pay attention to the type of the inputted image data, as in the image processing apparatus of the present invention.

Note that the image processing apparatus may be realized by a computer. In this case, the present invention encompasses (i) an image processing program for causing a computer to function as each means of the image processing apparatus so that the image processing apparatus is realized by the computer and (ii) a computer readable recording medium in which the image processing program is stored.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to an image forming apparatus, such as a copying machine and a multifunction printer including an image processing apparatus, an image reading apparatus, and the like.

REFERENCE SIGNS LIST

1: Digital color multifunction printer (image forming apparatus)
2: Image input apparatus
3: Image processing apparatus
4: Image output apparatus
5: Transmitting/receiving apparatus
6: Operation panel
9: Control section
10: Image memory
26: Document skew/size detecting section
27: Document skew/size correcting section
50: Image processing apparatus
52: Image memory
100: Image processing apparatus
110: Image area extracting section
111: Image area detecting section
112: Threshold value changing section
113: Type discrimination section
122: Size correcting section
152: Image area extracting section
155: Edge detection processing for skew detection section
156: Angle calculating section
157: Edge detection processing for image area extraction section
158: Coordinate information conversion section
159: Correction parameter generation section
300: Digital color scanner (image reading apparatus)

The invention claimed is:

1. An image processing apparatus comprising
an image area extracting section for identifying and extracting, on a basis of inputted image data obtained by reading a document with use of an image input apparatus, an image area within the document where an image is present,
a resolution converting section for carrying out resolution conversion on the inputted image data so that converted image data obtained by the resolution conversion has resolution suitable for detection processing,
the image area extracting section including an image area detecting section for comparing a pixel value of each part of an image of the converted image data with a threshold value so as to detect, as the image area, an area where a pixel value is larger than the threshold value, and
the image area extracting section further including a discrimination section for judging whether the inputted image data is binary image data or multi-level image data, and a threshold value changing section for changing, in a case where the inputted image data is binary image data, the threshold value to a value larger than that in a case where the inputted image data is multi-level image data.

2. The image processing apparatus according to claim 1, wherein:
the image area detecting section includes an image area edge detection section for comparing each pixel value of the image of the converted image data with a threshold value so as to detect an edge of the image area.

3. The image processing apparatus according to claim 1, further comprising:
a size detecting section for detecting a size of the image in the inputted image data on a basis of information on the image area extracted by the image area extracting section; and
a size correcting section for carrying out correction of a size to be outputted, with respect to the inputted image data on a basis of the size of the image detected by the size detecting section.

4. An image forming apparatus comprising the image processing apparatus as set forth in claim 1.

5. An image reading apparatus comprising the image processing apparatus as set forth in claim 1.

6. An image processing method comprising the step of
(a) identifying and extracting, on a basis of inputted image data obtained by reading a document with use of an image input apparatus, an image area within the document where an image is present, and
(b) carrying out resolution conversion on the inputted image data so that converted image data obtained by the resolution conversion has resolution suitable for detection processing,
the step (a) including the sub-step of (a-1) comparing a pixel value of each part of an image of the inputted image data with a threshold value so as to detect, as the image area, an area where a pixel value is larger than the threshold value, and
the step (a) further including the sub-steps of (a-2) judging whether the inputted image data is binary image data or multi-level image data and (a-3), in a case where the inputted image data is binary image data, changing the threshold value to a value larger than that in a case where the inputted image data is multi-level image data.

7. A non-transitory computer readable recording medium in which a program for causing the image processing apparatus as set forth in claim 1 to operate and for causing a computer to function as each section of the image processing apparatus is stored.

* * * * *